United States Patent
Liu

[19]

[11] Patent Number: 6,113,350

[45] Date of Patent: Sep. 5, 2000

[54] VERTICAL-AXLE POWER MACHINE

[75] Inventor: Hsun-Fa Liu, Fremont, Calif.

[73] Assignee: Stokwang Windpower Industrial Inc., Bartonsville, Pa.

[21] Appl. No.: 09/145,775

[22] Filed: Aug. 31, 1998

[51] Int. Cl.[7] ........................................... F03D 7/00
[52] U.S. Cl. ......................... 416/11; 416/117; 416/119; 416/9; 416/10; 416/13; 416/16; 416/12; 416/144; 416/145; 416/80; 416/87; 416/89; 415/4.1; 415/4.2; 415/4.4; 415/907
[58] Field of Search ..................... 415/4.1, 4.2, 4.4, 415/907; 416/117, 119, 136, 170 R, 144, 80, 87, 89, 145, 210 R, 210 A, 9, 10, 11, 12, 13, 16

[56] References Cited

U.S. PATENT DOCUMENTS

| | | | |
|---|---|---|---|
| 3,897,170 | 7/1975 | Darvishian | 416/119 |
| 4,150,363 | 4/1979 | Loth | 416/41 |
| 4,161,370 | 7/1979 | Oppolzer | 416/17 |
| 4,316,096 | 2/1982 | Syverson | 290/44 |
| 4,818,180 | 4/1989 | Liu | 416/117 |
| 4,818,181 | 4/1989 | Kodric | 416/196 A |
| 5,226,806 | 7/1993 | Lubbers | 416/132 B |

*Primary Examiner*—Edward K. Look
*Assistant Examiner*—Matthew T. Shanley
*Attorney, Agent, or Firm*—Raymond Y. chan; David and Raymond

[57] ABSTRACT

A vertical-axle wind power machine comprises a vertical axle, a plurality of jointed radial arms, a plurality of counterbalanced oblique blades at the support points thereof, a friction-rewarding rotary speed multiplying transmission, and an automatic rotary speed regulating means to be performed by either a wind-operated or an alternative digital controlled rotary speed regulating device; the combination of which provides the oblique blades with great sensitivity to the alternation of lee wind and head wind for automatic swinging to the most efficient lee angle at upstanding and overturned positions to sail nearly three quarters and streamline against the head wind resistance for the remaining quarter every circle of rotation, is able to convert the centripetal and centrifugal component forces to the same torque direction of the tangential component force from the same blade by an eccentric-guided angular bracket means and a fork-rooted radial arm, is able to offset the friction loss in the rotary speed multiplying process by pairs of bushed multiplying gears serially coupled between a pair of paralleled vertical shafts in connection with the vertical axle, and is able to output a stable and desired rotary speed by either a wind-operated or an electronically controlled rotary speed regulating device regardless the variable wind speed.

22 Claims, 16 Drawing Sheets

VERTICAL-AXLE POWER MACHINE

FIELD OF THE PRESENT INVENTION

The present invention relates to an apparatus generally designated as a windmill, and more particularly to a vertical-axle wind power machine, which can not only catch and convert maximum amount of lee wind to mechanical power and eliminate the head wind resistance by respective oblique blades, but also convert useless and destructive centripetal and centrifugal component forces from the oblique blades to useful torque and produce stable accelerated and regulated rotary speed of mechanical power from the unstable and variable wind force.

BACKGROUND OF THE PRESENT INVENTION

Although there were varieties of prior arts regarding windmills, apparently no means had ever achieved the objects of enabling any blade or vane to identify the alternation of lee wind and head wind to perform instant swinging to appropriate positions to sail up to 250 degrees and streamline against windward resistance no more than 110 every circle of rotation, and none of the prior arts ever provided any easily recoverable and removable means for maintenance and anti-typhoon purposes, any anti-friction rotary speed multiplying transmission and regulating means for the "low-rotary-speed featured" vertical-axle windmill, and any means to overcome the loss of centripetal and centrifugal component wind forces from the blade to the vertical axle at a time.

Although a U.S. Pat. No. 4,818,180 relating to the vertical-axle windmill ever innovated and owned by the inventor of the present invention did enable the blade therein to sail about 260 degrees a circle and to convert centripetal and centrifugal component forces to a same torque direction, its swinging and counterbalancing means were less satisfactory and need further improvement.

SUMMARY OF THE PRESENT INVENTION

It is a first object of the present invention to provide a vertical-axle wind power machine which can eliminate the frictional loss for promoting the efficiency of multiplying transmission, wherein a friction- rewarding multiplying transmission is performed by pairs of bushed united multiplying gears serially coupling and multiplying between a pair of paralleled and bushed shafts in a machine room to feed back the friction effect in the reciprocal multiplying process for an output by a conical friction wheel.

A further object of the present invention is to provide a vertical-axle wind power machine which can acquire and output regulated rotary motion, wherein a rotary speed regulating mechanism is performed by a fluted guide spindle, a slide friction wheel, a coaxial output wheel, and a U-shaped fork clamp. The fluted slide guide spindle is set in parallel with the ridge of the conical friction wheel of the rotary speed multiplying transmission. The slide friction wheel is pinned at the flute of the fluted guide spindle and coupled with the conical friction wheel to respond to the rotary motion of the conical friction wheel. The output wheel is in coaxial and synchronous attachment with the slide friction wheel at the fluted guide spindle to output the accelerated and regulated rotary motion. The U-shaped fork clamp is set to clamp the fluted guide spindle and relative sides of the slide friction wheel to impel the slide friction wheel sliding along the fluted guide spindle and along the ridge of the conical friction wheel, by sliding the U-shaped fork clamp back and forth in connection and interaction with the rotary speed multiplying transmission and appropriate rotary speed regulating means to produce the accelerated and regulated rotary motion for output by the coaxial output wheel.

Yet another object of the present invention is to provide a vertical-axle wind power machine which can automatically regulate the rotary motion in connection with the rotary speed regulating mechanism and in interaction with the variable wind speed to improve the quality of mechanical power, wherein a wind-operated rotary speed regulator is performed by a downwind wind shield, a spring controlled slide horizontal lever, a guide wire and a spring controlled slide guide lever. The downwind wind shield, the spring controlled slide horizontal lever, the guide wire and the spring controlled slide guide lever are linked in serial. The U-shaped fork clamp of the rotary speed regulating mechanism is duly pinned at the spring controlled slide guide lever to regulate the rotary speed in interaction with the guide wire, the downwind wind shield and variable wind speed.

Still another object of the present invention is to provide a vertical-axle wind power machine, wherein an alternative rotary speed regulating mechanism is performed by a worm spindle, a pair of stop means, a control wheel and a bi-directional motor. The worm spindle takes the same position and job of the slide guide lever of the wind-operated rotary speed regulator. The U-shaped fork clamp of the rotary speed regulating mechanism is duly pinned at the worm flute of the worm spindle and is impelled back and forth along the pivoting worm flute following the commands of clockwise, stop and counterclockwise from the bi-directional motor and a digital or electronic rotary speed regulating device as an alternative means to regulate the rotary speed.

Still another object of the present invention is to provide a vertical-axle wind power machine, wherein a multipurpose turbine framework comprises a vertical axle, a plurality of jointing brackets, a plurality of jointing radial arms, a flywheel, a plurality of stay means, a plurality of caster rollers, a circular rail, a caster roller kinetic feed back mechanism, and a circuit distribution and switching network; in which the jointing brackets each is secured at the vertical axle and is further jointed by either a hinged wheel cramp bracket to support the T-footed radial arms or by an angular bracket to support the fork-rooted radial arm, the jointing brackets and the jointing radial arms can further convert the useless and destructive centripetal and centrifugal component forces to a same torque direction by an eccentric guided torque conversion mechanism and can be raised and lowered by sliding the stay means up and down along the vertical axle; the vertical axle and the flywheel are mounted at the upper end of the master vertical shaft of the multiplying transmission mechanism to facilitate maintenance, replacement and removing operation; the flywheel is able to stabilize the rotary motion and acts as a base of other facilities; the caster rollers are mounted at the flywheel to run along a circular rail on either the roof of the machine room or a separate frame work to reinforce the tolerance of the turbine framework against strong wind; one of the caster rollers has a coaxial output wheel to convert the rolling kinetic to mechanical power to support the control tools on the flywheel; the control circuit and switch means are set between the flywheel and the machine room by appropriate number of isolated concentric-circular conductive tracks at the ceiling of the flywheel and the coupling slide circuit contacts on the roof of the machine room in connection with a switching and remote control device.

Still another object of the present invention is to provide a vertical-axle wind power machine, wherein a plurality of counterweighted oblique and dynamic blades are jointed to the extremity and the intermediate section of respective radial arms under the control of appropriate stop means to provide each blade with great sensitivity to identify the alternation of lee wind and head wind, to perform instant swinging motion toward appropriate positions to load lee wind and sail predetermined range by both sides, and to streamline against the windward resistance on their return course every circle of rotation.

BRIEF DESCRIPTION OF THE DRAWINGS

FIG. 5a-2 is an enlarged view of the angle stay and buffer stay according to the above preferred embodiment of the present invention.

FIG. 5b-1 is a front view of the bushed axial sleeve and the tilted or oblique blade according to the above preferred embodiment of the present invention.

FIG. 5b-2 is an enlarged view of the angle stay, the joint and the threaded connector according to the above preferred embodiment of the present invention.

Figure 1A:
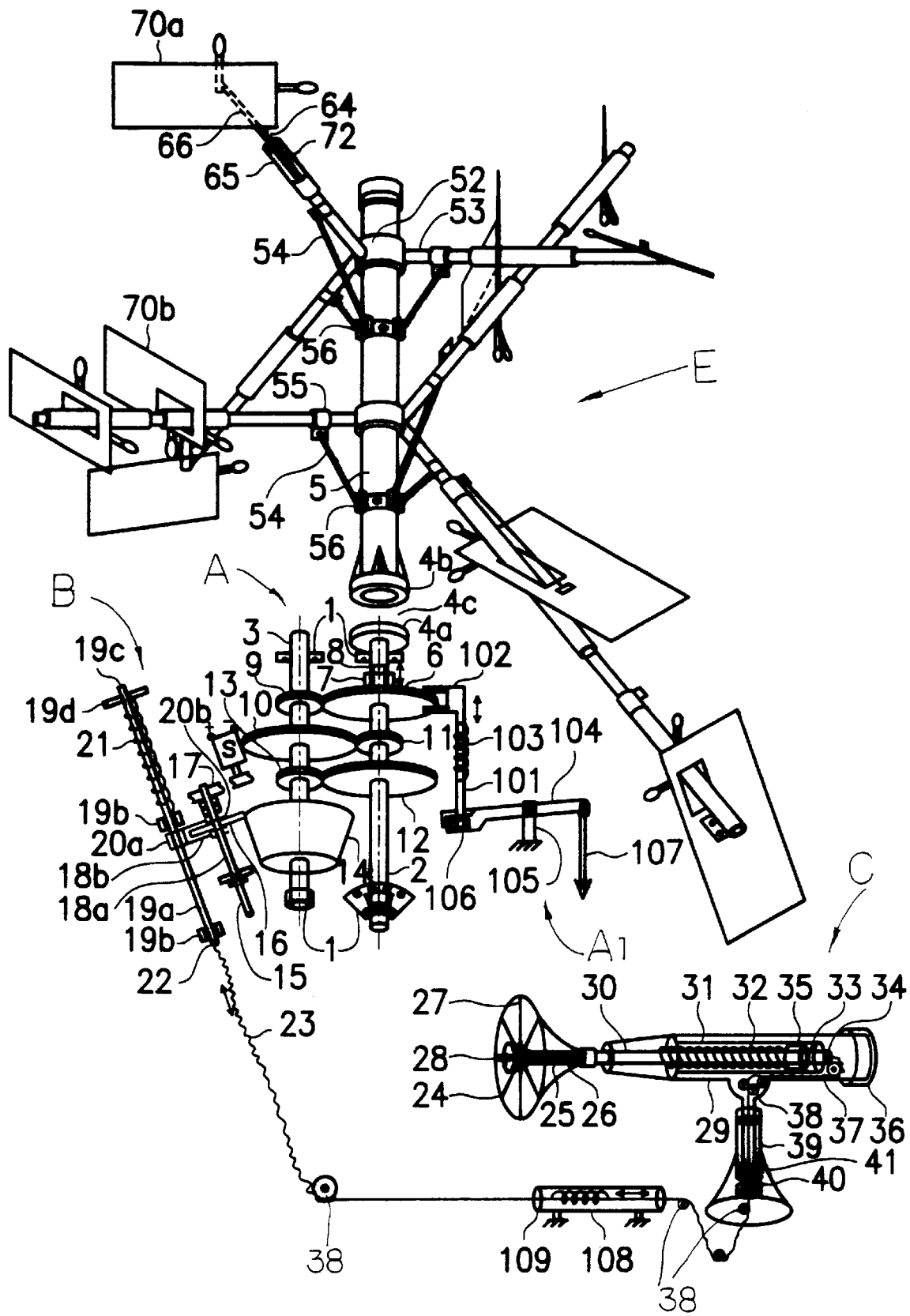
FIG. 1a is a perspective view of a vertical-axle wind power machine according to a preferred embodiment of the present invention.

1 the bearings
2 the master vertical shaft
3 the coupling vertical shaft
4a the disc bracket
4b the disc pedestal
4c the flywheel
4d the stay
5 the vertical axle
6 the master gear or the first driving gear
7 the hub or the support point of the master gear 6
8 the flute or slide way
9 the first driven gear to the first pair of bushed united multiplying gears
10 the second driving gear to the first pair of bushed united multiplying gears
11 the second driven gear to the second pair of bushed united multiplying gears
12 the third driving gear to the second pair of bushed united multiplying gears
13 the third driven gear to the third pair of bushed united multiplying gear
14 the fourth driving wheel (conical friction wheel) to the third pair of bushed multiplying gear
15 the fluted guide spindle
16 the slide friction wheel
17 the output wheel
18a the flute or slide way
18b the arm of the U-shaped clamp
19a the slide guide lever
19b the bushed lever bracket
19c the threats
19d the nut 20*a* the U-shaped clamp
20*b* the forks at the arms of the U-shaped clamp
21 the compression spring
22 the bore
23 the guide wire
24 the wind shield
25 the core sleeve
26 the slide horizontal lever
27 the radial stays
28*a* the threats
28*b* the nut
29 the T-shaped tubular support
30 the nozzle
31 the cylinder
32 the compression spring
33 the threads
34 the bore
35 the adjustable piston or nut
36 the cap
37 the recessed tunnel
38 the fixed pulleys
39 the upstanding tubular base
40 the threads
41 the nut
42 the worm guide spindle
43*a* the arms of the slide U-shaped clamp
43*b* the forks at the arms of the slide U-shaped clamp
44*a* the worm
44*b* the worm flute
45 the slide U-shaped clamp
46 the stop
47 the belt wheel
48 the bi-directional motor
49*a* the rotary speed sensor
49*b* the rotary speed monitor
50 the digital rotary speed control kit
51 the frequency monitor
52 the hinged cramp bracket
53 the radial arm
54 the angle stay (or stay rod)
55 the hinged cramp
56 the hinged slide cramp
57 the upper tile of the hinged cramp bracket 52
58 the lower tile of the hinged cramp bracket 52
59 the hinge pin
60 the lugs and notches
61 the T-shaped anchor slot
62 the T-shaped anchor or joint
63 the L-shaped slot
64 the blade axis
65 the bushed sleeve for the blade-axis 64
66*a* the angle stay
66*b* the joint
66*c* the threaded connector
67*a* the buffer stay
67*b* the compression spring
67*c*, 67*d* the counter sleeves
67*e* the threaded connector
67*f* the joint
68 the threads
69 the adjustable counterweight
70*a* the oblique blade element for connecting to the extremity of the radial arm
70*b* the oblique blade element having a window at the support point for connecting to either the extremity or the intermediate section of the radial arm
70*c* the oblique blade element having an opening at the support point for connecting to either the extremity or the intermediate section of the radial arm
71 the projecting block
72 the hinged cramp stop
73 the upper tile of the cramp stop
74 the lower tile of the cramp stop
75 the lugs and notches
76 the L-shaped rib
77 the lip stop
78 the lug stop and joint
79*a* the cross joint sleeve
79*b*, 79*c* longitudinal joint sleeves
79*d*, 79*e* the symmetric side cross sleeves at the bushed radial sleeve 90
80 the support point of the blade
81 the recessed tube of the blade rib
82 the flute with single-sided notches
83 the notch
84 the bolt
85 the cross axis of the blade axis
86 the lug joint at the secondary support point of the blade element
87*a* the window of the blade element 70*b*
87*b* the opening of the blade element 70*c*
87*c* the hinge for attachment by an adjustable counterweight to close the opening 87*b*
87*d* the latch to lock the adjustable counterweight to the opening 87*b*
88 the bushed radial sleeve for the blade element 70*b*
89 the lug stop and joint
90 the bushed radial sleeve
91 the circular rail
92 the radial shaft
93 the shaft bracket
94 the bearings
95 the roller (caster) or the friction wheel
96 the belt wheel
97*a*, 97*b*, 97*c* the isolated concentric circular conductive tracks
98*a*, 98*b*, 98*c* the conductive slide contacts
99*a*, 99*b*, 99*c* the supporting brackets
100*a*, 100*b*, 100*c* the springs
100*d* the switch
101 the upstanding slide lever
102 the side fork of the upstanding slide lever 101
103 the spring
104 the horizontal lever
105 the support of the joint lever
106 the joint of the levers 101 and 104
107 the linking rod or wire
108 the extension spring
109 the spring shelter
110 the vertical axial sleeve
111*a*, 111*b* the relative arms of an angular bracket
112*a* the longer fork branch of the radial arm (53)
112*b* the shorter fork branch of the radial arm (53)
113*a* the cross bore in the vertical axle
113*b* the cross bore in the vertical axial sleeve
113*c* the bolt
114*a* the radial girder
114*b* the radial lug
115*a* the bore in the radial girder
115*b* the bore slot in the radial lug
115*c* the vertical opening in the fork stem
115*d* the cross bore in the fork stem
115*e* the pin or axis
116*a*, 116*b* the bore slots in relative arms to the angular bracket
117*a* the bore in the longer fork branch 117b the bore in the shorter fork branch
117c the fore or inner fulcrum at the longer fork branch 117a
117d the after or outer fulcrum at the shorter fork branch 117b
118 the lever or the pin
119a the radial arm sleeve
119b the cross bores in the radial arm and the radial arm sleeve 119a
119c the bolt
120a the radial arm sleeve
120b the bushes in the radial arm sleeve
121 the fixed collar baffle
122 the collar wheeler
123 the blade axis
124 the cross sleeve or joint (79a)
125a, 125b the half-cut collar baffles
126 the rim of the fixed collar baffle
127a, 127b corresponding bores in the rim of the fixed collar baffle and the half-cut collar baffles
128 the internal plane of the fixed collar baffle
129 the fan-shaped block on the internal plane of the fixed collar baffle
130 the fan-shaped block on the collar wheeler
131 the lug
132 the bore
133a the cramp at the angle stay or jack stay 54
133b the lug with bore
133c the counter angle stay

DETAILED DESCRIPTION OF THE PREFERRED EMBODIMENT

Referring to the drawings, a vertical-axle wind power machine according to a preferred embodiment of the present invention is illustrated, which comprises a multipurpose turbine framework D comprising a vertical axle, a plurality of jointing brackets secured at the vertical axle and jointed with a plurality of radial arms, a plurality sets of oblique blades E respectively mounted on the radial arms of the multipurpose turbine framework D, wherein the oblique blades E are arranged to bear wind power for driving the vertical axle to rotate for a predetermined range via respective radial arms, so that the vertical axle is driven to rotate continuously by means of the oblique blades E; and a plurality of counterbalancing means for acquiring a balance condition at the support point of respective oblique blades so as to make sensitive response to wind pressure and to swing instantly and lightly to appropriate positions to catch lee wind and streamline against windward resistance.

The vertical-axle wind power machine further comprises a friction-rewarding multiplying transmission A for transmitting a low speed rotation of the vertical axle driven by the oblique blades E to output a high speed rotation.

The vertical-axle wind power machine further comprises a rotary speed regulating mechanism B for regulating the unstable high speed rotation output from the friction-rewarding multiplying transmission A to a stable rotary output by either a wind-operated rotary speed regulator C or an alternative electronically-controlled rotary speed regulating mechanism equipped and interacting with the rotary speed regulating mechanism B for detecting the wind power borne by the oblique blades E so as to control the regulation of the rotary speed regulating mechanism B.

The vertical-axle wind power machine further comprises a caster roller kinetic feed back transmission and a circuit distribution and switching network, wherein the caster roller kinetic feed back transmission comprises a flywheel connected to the vertical axle, a circular rail secured under the flywheel and on a roof frame of the machine room, a plurality of caster rollers distributed around the flywheel to run along the circular wheel, and a coaxial wheel linked with one of the caster rollers for feeding back the rolling kinetic to a machinery on the flywheel.

The vertical-axle wind power machine further comprises a circuit distribution and switching network which comprises a plurality of isolated concentric circular conductive tracks attached to the ceiling of the flywheel, a plurality of coupling conductive slide contacts to slide along the concentric circular conductive tracks to link the control circuits between the rotating flywheel and the fixed machine room for remote control of mechanical operation on the flywheel.

As shown in FIG. 1a, a friction-rewarding multiplying transmission A comprises a master vertical shaft 2, a coupling vertical shaft 3, a master driving gear 6, pairs of bushed united multiplying gears 9 & 10, 11 & 12 and 13 & 14, and a clutch A1. The master vertical shaft 2 and the coupling vertical shaft 3 are supported in parallel by bearings 1 in a machine room. A top of the master vertical shaft 2 extends to the roof of the machine room and is connected to a disc bracket 4a with vertical bores. The master driving gear 6 being the first driving gear is attached to and pinned at the support point of the hub 7 upon a slide way 8 on an upper portion of the master vertical shaft 2 for keeping synchronous rotation with and being able to slide along the slide way 8 on the master vertical shaft 2. The first pair of bushed united multiplying gears including a first driven gear 9 and a second driving gear 10 are attached to the coupling vertical shaft 3 to let the first driven gear 9 couple with the first driving gear 6. The second pair of bushed united multiplying gears including a second driven gear 11 and a third driving gear 12 are attached to the master vertical shaft 2, wherein the second driven gear 11 is coupled with the second driving gear 10 of the first pair of bushed united multiplying gears. The third pair of bushed united multiplying gears including a third driven gear 13 and a fourth driving gear 14, wherein the third driven gear 13 is coupled with the third driven gear 12 of the second pair of bushed united multiplying gears, and the last driving gear of the last pair of bushed united multiplying gears is replaceable with a conical friction wheel when performing as a regulating wheel for coupling with the next friction wheel, by which the friction effect upon the master and coupling vertical shafts 2 and 3 is almost entirely fed back each other and offset in the multiplying transmission process and the efficiency of multiplying transmission is promoted accordingly.

It is worth to mention that any of the coupling gears such as the third driving gear 12 and the fourth driven gear 13 are replaceable by conversely linked belt wheels to offset the thrust effect of all other coupling gears in the transmission process and yet to maintain consistent rotary.

Figure 1B:
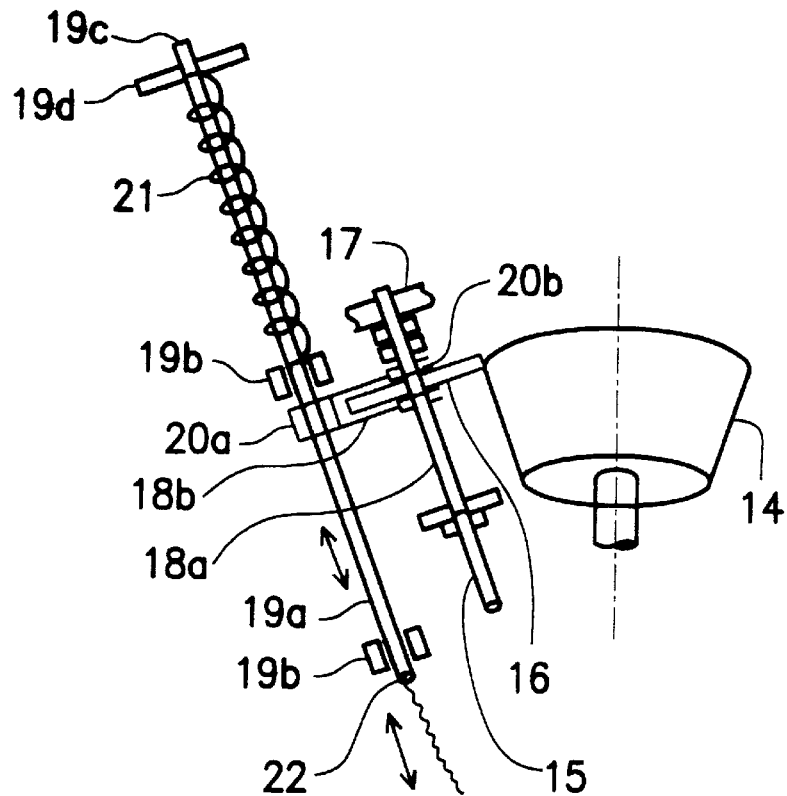
FIG. 1b is a front view of the rotary speed regulating element between the transmission mechanism and the wind-operated rotary speed regulator according to the above preferred embodiment of the present invention.
Figure 1C:
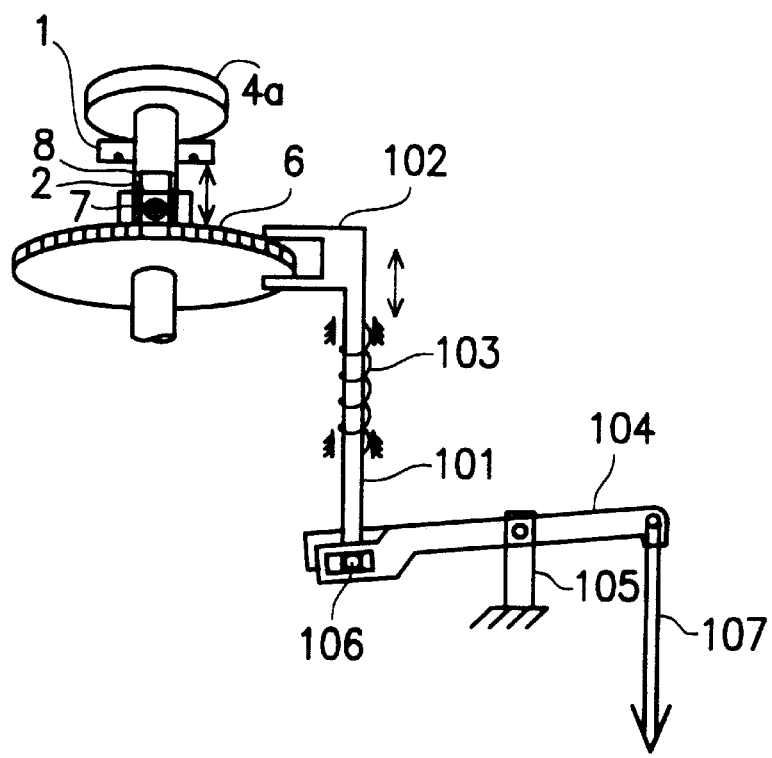
FIG. 1c is a front view of the clutch of the transmission mechanism according to the above preferred embodiment of the present invention.

As shown in FIGS. 1a and 1c, a clutch A1 contains an upstanding slide lever 101, a spring means 103, a horizontal lever 104 and a linking means 107 by either a level or a wire. The upstanding slide lever 101 has a side fork 102 at a top thereof, which is mounted close to the master gear 6 in the machine room with the side fork 102 to clamp the rim of the master driving gear 6. The spring 103 is secured over the slide lever 101 by one end and with the other end thereof secured at a support thereof. The horizontal lever 104 is pivotally mounted on a support 105, wherein one end of the horizontal level 104 is jointed to a lower joint 106 of the upstanding slide lever 101 while the other end thereof is connected to a linking means 107 by either a level or wire. When the linking means 107 is pulled down, the upstanding slide lever 101 will activate the elasticity of the spring means 103 and the side fork 102 thereof will elevate the master gear 6 along the slide way and off the first driven gear 9 to stop the friction-rewarding multiplying transmission A. Conversely when the linking means 107 is released, the upstanding slide lever 101 and its side fork 102 will be pulled downward by the spring means 103, and at the same time the master driving gear 6 will slide downward by its gravity in addition to the elasticity of the spring means 103 to resume its link with the first driven gear 9 and to restart the friction-rewarding multiplying transmission A.

Figure 3A:
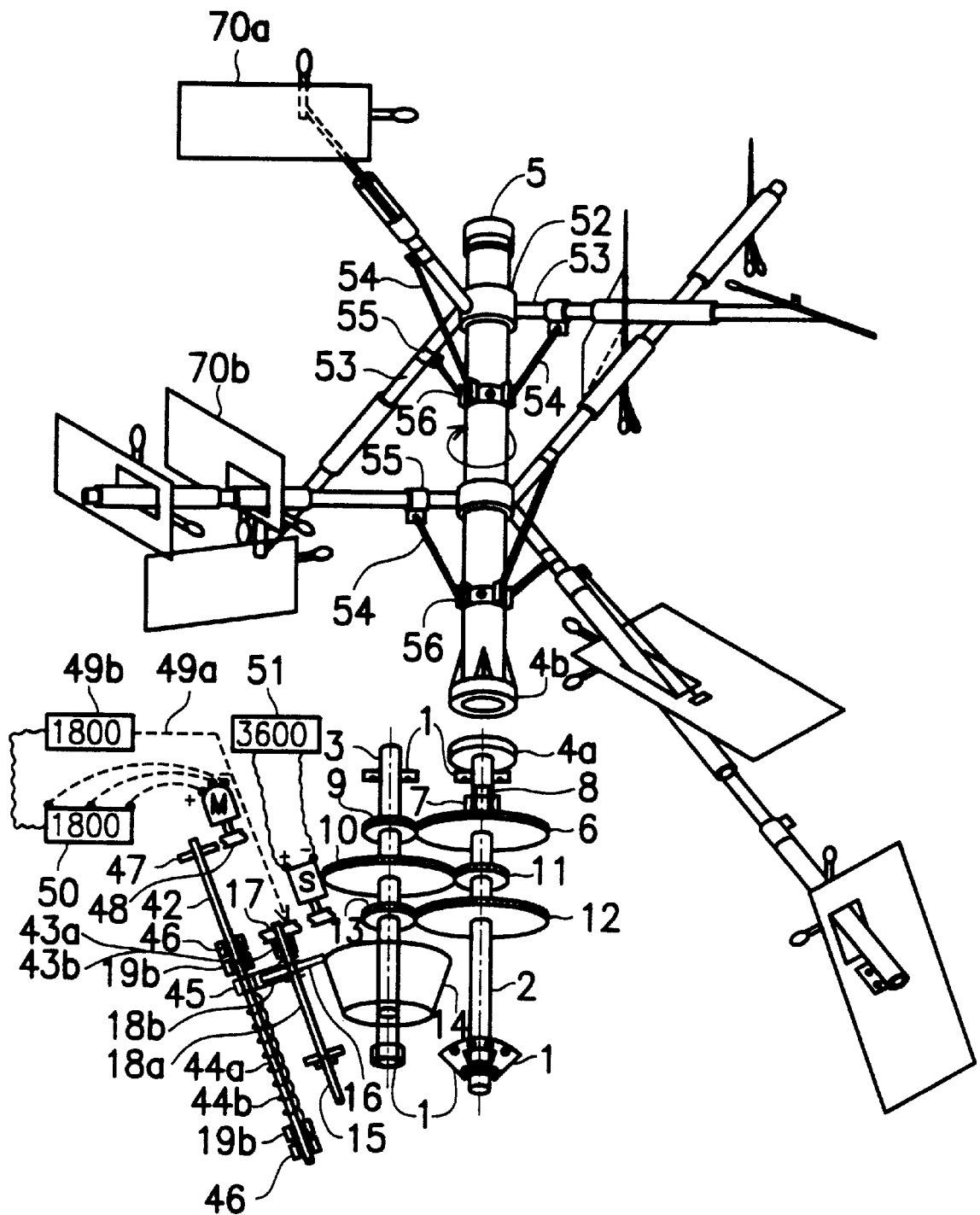
FIGS. 3a and 3b are the front views of an alternative rotary speed regulating mechanism for the digital or electronic rotary speed monitor and regulator to the transmission mechanism according to the above preferred embodiment of the present invention.
Figure 3B:
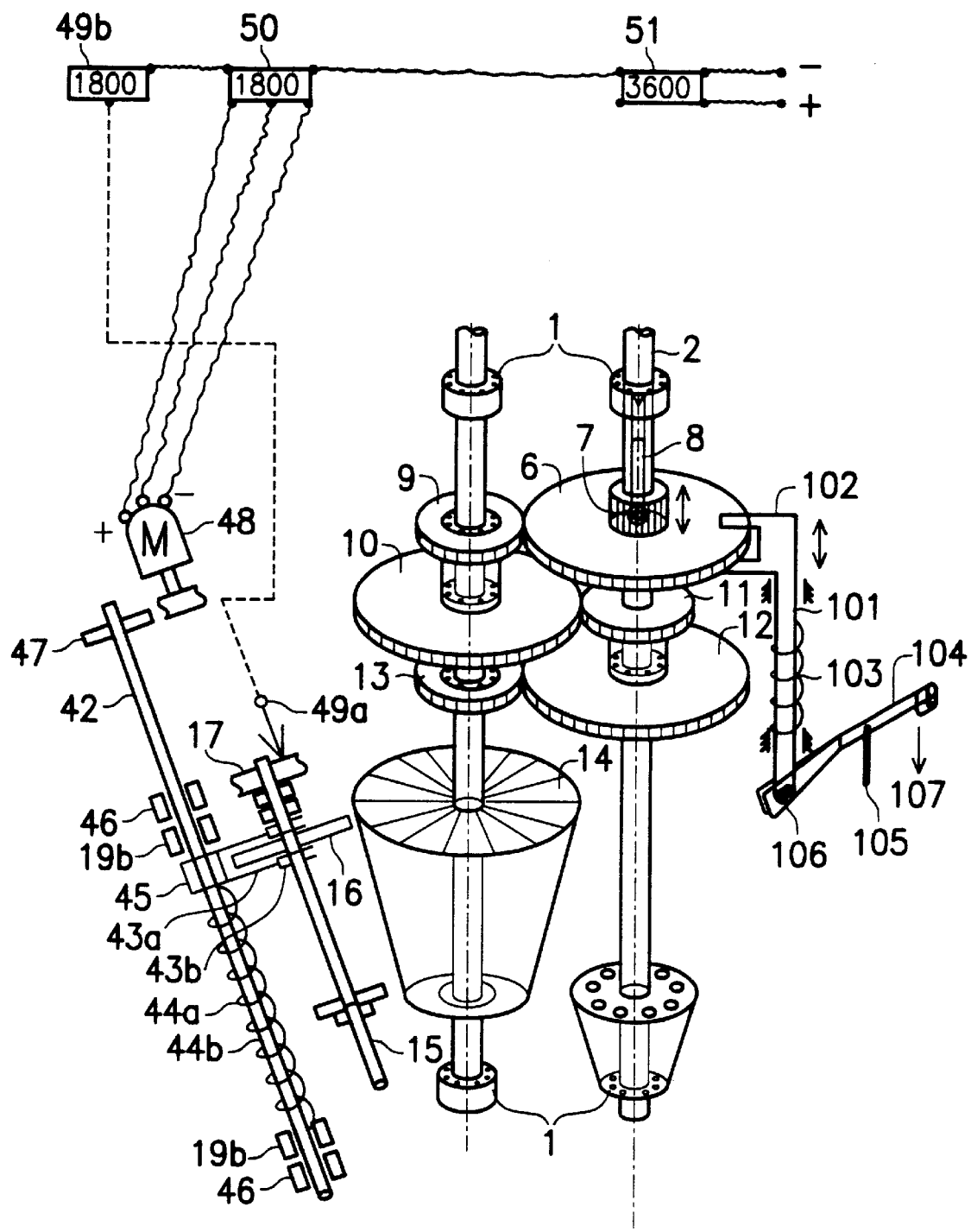

As shown in FIGS. 1a, 1b and 3b, the rotary speed regulating mechanism B comprises a fluted guide spindle 15, a slide friction wheel 16, an output wheel 17, and a U-shaped fork clamp 20a. The fluted guide spindle 15 provides a flute or slide way 18a and is mounted in parallel with the ridge of the conical friction wheel 14 of the rotary speed multiplying transmission A. The slide friction wheel 16 is attached to the slide way 18a on the fluted guide spindle 15 to enable the slide friction wheel 16 to slide along the slide way 18a and couple with the conical friction wheel 14. The output wheel 17 is rigidly affixed to an appropriate end on the fluted guide spindle 15 for an output to a coupling input wheel of any machinery. The U-shaped fork clamp 20a has a sleeve coupler and two clamping arms 18b each having a fork 20b. The two forks 20b at the clamp arms 18b respectively clamp relative sides of the slide friction wheel 16 and clamp relative sides of the guide spindle 15 so that when the U-shaped fork clamp 20a slides toward either end of the slide guide level 19a, the forks 20b will move the slide friction wheel 16 toward the same direction along the ridge of the conical friction wheel 14 without swinging off the slide friction wheel 16 regardless the rotary direction of the slide friction wheel 16.

Figure 2:
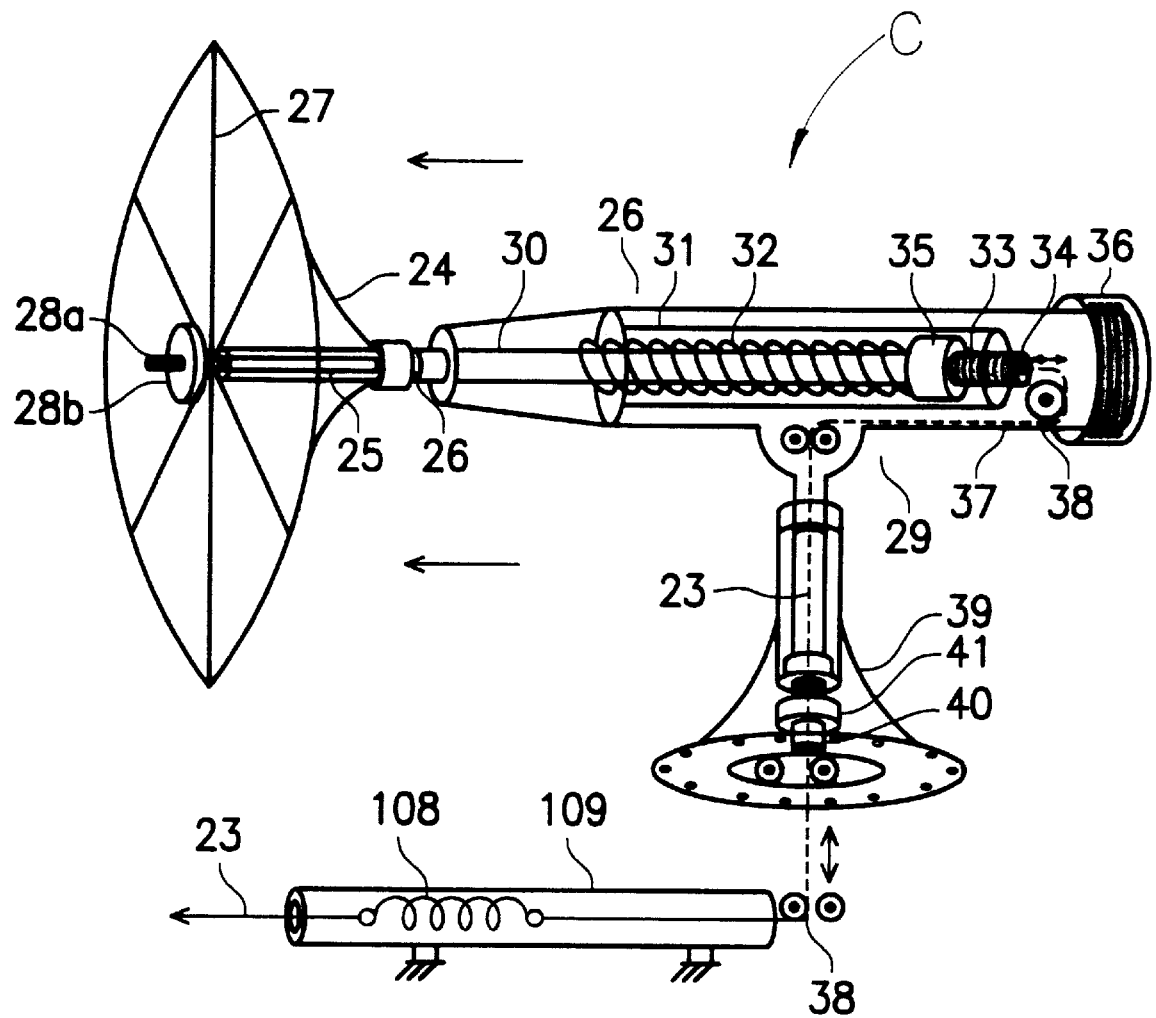
FIG. 2 is a front view of the wind-operated rotary speed regulator according to the above preferred embodiment of the present invention.

As shown in FIGS. 1a and 2, the wind-operated rotary speed regulator C comprises a slide guide lever 19a, a compression spring 21, a guide wire 23, a wind shield 24, a slide horizontal lever 26, a regulator compression spring 32, a T-shaped tubular support 29, a bushed upstanding tubular base 39 and a plurality of fixed pulleys 38. The slide guide lever 19a, which has a threaded portion 19c at one end and a bore 22 at the other end, is supported by the bushed brackets 19b in parallel with the fluted guide spindle 15 of the rotary speed regulating mechanism B and is attached by the sleeve coupler of the U-shaped clamp 20a. The compression spring 21 is worn upon the slide guide lever 19a from the threaded portion 19c and the elasticity thereof is adjusted by the nut 19d till the compression spring 21 is stopped by the closer bushed bracket 19b and till the U-shaped clamp 20a is pulled to the bigger end of the conical friction wheel 14 at the same time. The bore 22 at the slide guide lever 19a is connected to a first end of the guide wire 23.

The wind shield 24 has a core sleeve 25, a number of radial stays 27 at the opening thereof, and a hub at the bottom thereof The wind shield 24 is worn from the fore end of the slide horizontal lever 26 till its bottom hub is seated at the flange of the slide horizontal lever 26 and its core sleeve 25 is tightened by a nut 28b on the threads 28a at the fore end of the slide horizontal lever 26. A after section of the slide horizontal lever 26 is inserted into a corresponding nozzle 30 and a cylinder 31 of a horizontal tube of the T-shaped tubular support 29. The regulating compression spring 32 is worn over the after section of the slide horizontal lever 26 in the cylinder 31 and its elasticity is adjustable by the piston nut 35 secured on the after threaded portion 33 of the slide horizontal lever 26. The piston nut 35 has a corresponding diameter to that of the cylinder 31 and reserves an appropriate gap between the regulating compression spring 32 and the cylinder 31 to avoid friction. A cap 36 is covered at the after opening of the horizontal tube of the T-shaped tubular support 29. An upstanding tubular spindle of the T-shaped tubular support 29 is inserted through the bushed upstanding tubular base 39 and is locked by a locking nut 41 upon a lower threaded portion 40 provided at a lower end of the upstanding tubular spindle of the T-shaped tubular support 29. The plurality of fixed pulleys 38 are fitted at appropriate sites along a recessed tunnel 37 provided under the cylinder 31, the upstanding tubular spindle in the upstanding tubular base 39, and all the way to guide the second end of the guide wire 23 to the bore 22 at the slide guide lever 19a.

An extension spring 108 is in serial connection with the guide wire 23 at an appropriate site as an additional proof to filter out or absorb the shocks or impacts from gusts. A sleeve 109 having eyed covers at both ends is worn over the extension spring 108 and is rigidly braced to protect and decline the extension spring 108 from moving beyond the allowed distance for agreement to the extension limit of the slide horizontal lever 26 and the slide guide lever 19a and to the length of the ridge of the conical friction wheel 14.

The wind-operated rotary speed regulator C is fitted close to the machine room and is clearly open to the wind, and when it is connected to the U-shaped clamp of the rotary speed regulating mechanism B as above described, it is ready to work. When the wind strengthens its pressure upon the wind shield 24, the said wind shield 24 will pull the slide horizontal lever 26 and the guide wire 23 forward, and the guide wire 23 will responsively pull the slide guide lever 19a, the attached U-shaped clamp 20a and its forks 20b, and the slide friction wheel 16 to slide toward the smaller end of the conical friction wheel 14. When the wind weakens its pressure upon the wind shield 24, the slide horizontal lever 26 will be pushed backward by the regulating compression spring 32 to loosen the guide wire 23. Then the slide guide lever 19a will be pulled back by the compression spring 21, and in turn the slide guide lever 19a, the attached U-shaped clamp 20a and its forks 20b will pull the slide friction wheel 16 back toward the bigger end of the conical friction wheel 14. When the wind changes its direction, the wind shield 24 will turn downwind upon the bushed upstanding spindle of the T-shaped tubular support 29. Therefore the output wheel 17 at the fluted guide spindle 15 will be able to output regulated or required rotary speed of mechanical power, by which the object of promoting the efficiency of multiplying transmission and the quality of mechanical power is achieved at a time.

A as shown in FIGS. 3a and 3b, an alternative mode of the rotary speed regulating mechanism B is illustrated, which comprises a worm spindle 42, a pair of stops 46, and a control wheel 47. The worm spindle 42 is arranged to take the place and the job of the slide guide lever 19a of the wind-operated rotary speed regulator C. A slide U-shaped fork clamp 45 is duplicated from the U-shaped fork 20a of the rotary speed regulating mechanism B and is pinned at the worm flute 44b to maintain the same relationship to the fluted guide spindle 15 and the slide friction wheel 16 of the rotary speed regulating mechanism B as done by the slide lever 19a. The stop means 46 are secured to relative sides of the bushed spindle bracket 19b to stop the worm spindle 42 from sliding toward either end thereof. The control wheel 47 is rigidly attached to the worm spindle 42 and is further linked with a bi-directional motor 48 to control the rotary direction of the worm spindle 42, the slide direction of the slide U-shaped fork clamp 45 along the worm flute 44b, and the slide direction of the slide friction wheel 16 along the conical friction wheel 14 under the commands of Clockwise, Stop and Counterclockwise from a commonly used electronic rotary speed control device 50 with a rotary speed sensor 49a at the output wheel 17 or otherwise with a frequency monitor 49b to a source circuit to replace the said wind-operated rotary speed regulator C.

As shown in FIGS. 1a, 4a, 4b, 6, 7, 9a, 9b, 9c and 9d, the multipurpose turbine framework D comprises a vertical axle 5, a plurality of jointing brackets, a plurality of jointing radial arms, a plurality of cramps 55, a plurality of hinged slide cramps 56, a flywheel 4c, a plurality of jack stays 4d, a plurality of caster rollers 95, a circular rail 91, a roller kinetic feed back transmission, and a circuit distribution and switching network.

The vertical axle 5 has a disc pedestal 4b provided at the bottom end thereof. The disc pedestal 4b has a plurality of axial bores distributed corresponding to the vertical bores on the disc bracket 4a of the master vertical shaft 2, so that the disc pedestal 4b and the disc bracket 4a can be in coaxial connection by bolts with the hub of the flywheel 4c sandwiched between.

The jointing brackets include a plurality of hinged wheel bracket 52 and a plurality of angular brackets both of which been secured at the vertical axle 5, wherein the hinged wheel brackets 52 each contains a lower hinged cramp 58 and an upper hinged cramp 57, both of which have corresponding lugs and notches 60 at the opening, vertical bores around, coaxial hinge engagement 52 with an axis 59, and a coupling curve to cramp the vertical axle 5, by which the upper hinged cramp 57 can be covered and bolted upon the lower hinged cramp 58 and both of the upper hinged cramp 57 and the lower hinged cramp 58 can be firmly and rapidly cramped on the vertical axle 5 and be easily detached therefrom. The lower hinged cramp 58 has a plurality of T-shaped anchor slots 61 evenly spaced and distributed therein. Each of the T-shaped anchor slots 61 has a tangential flute inside and a radial opening outward.

The angular brackets each comprises an axle sleeve 110, a pair of bracket arms 111a and 111b, a radial girder 114a, a stay 54, a counter stay 113c, and a fork-rooted radial arm 53, the combination of which produces an eccentric-guided torque conversion means of centripetal and centrifugal forces, wherein the vertical axial sleeve 110 and the vertical axle 5 have corresponding cross bores 113a and 113b for sleeve attachment by bolts 113c. The bracket arms 111a and 111b is connected to the vertical axial sleeve 110. The radial girder 114a, which has a bore 115a at its inner end, is connected to the vertical axial sleeve 110 between the bracket arms 111a and 111b and extends its outer end off the angle to form the radial lug 114b. The relative bracket arms 111a and 111b of the angular bracket has a pair of symmetric bore slots 116a and 116b on relative sides of the bore 115a.

The radial arms 53 each is provided with a T-shaped anchor 62 at the root end and an optional L-shaped slot at the tubular end thereof and is jointed to and locked in the respective T-shaped anchor slots 61 between the upper hinged cramp 57 and the lower 35 hinged cramp 58 to provide the T-rooted radial arms 53 with free swinging motion between the horizontal and hanging positions upon the hinged wheel bracket 52 without dropping therefrom. Each of the hinged cramps 55 is firmly attached at an appropriate site in the intermediate section of the radial arm 53. Each of the hinged slide cramps 56 is worn upon the vertical axle 5 either above or below the hinged 40 wheel bracket 52. Each of the stay 54 is jointed between the respective hinged cramps 55 and the hinged slide cramp 56 by joint couplers at both ends thereof, so that the T-rooted radial arms 53 connected to the same slide hinged cramp 56 can be raised and lowered by sliding the hinged slide cramp 56 up and down and be held in horizontal and radial status by bolting the hinged slide cramp 56 to the vertical axle 5. Therefore the object of making recoverable T-rooted radial arms is attained.

As shown in FIGS. 9a to 9d, the radial arm 53 is provided with an alternative fork stem with fork branches 112a and 112b of unequal length at the fork stem thereof The longer (fore) fork branch 112a and the shorter (after) fork branch 112b having asymmetric bores 117a and 117b in the extremities thereof. The fork stem of the radial arm 53 has a radial inward opening 115c and a cross bore 115d and is jointed to and hung on the radial lug 114b by an axis 115e through the corresponding bore slot 115b and the bore 115d to provide the fork stem with free slide and swinging motion thereupon. A lever 118 is inserted through the bores 117a and 117b in the fork branches 112a and 112b and the bore slots 116a and 116b in the bracket arms 111a and 111b via the bore 115a at the inner end of the girder 114a to hold the fork-rooted radial arm 53 in horizontal status; resulting that when the axis 115e at the fork stem rests in the middle of the bore slot 115b in the lug 114b, the fore end of the lever 118 in the longer fork branch 112a is firmly rested at the inner end (the fore eccentric fulcrum 117c) of the bore slot 116a, and the after end of the lever 118 in the shorter fork branch 112b is rested at the outer end (the after eccentric fulcrum 117d) of the bore slot 116b; when the fork-rooted radial arm 53 is pushed inward, the fore end of the lever 118 will push the fore eccentric fulcrum 117c to produce forward torque and to lever the after end of the lever 118 against the outer end (after eccentric fulcrum 117d) of the bore slot 116b and against the lug 114b via the bore 115a at the inner end of the radial girder 114a to convert the centripetal force to the same direction of torque; and when the radial arm 53 is pulled outward, the after end of the lever 118 will pull the outer end (after eccentric fulcrum 117d) of the bore slot 116b to produce forward torque and to lever the fore end of the lever 118 against the inner end (fore eccentric fulcrum 117c) of the bore slot 116a and against the lug 114b via the bore 115a at the inner end of the radial girder 114a to convert the centrifugal force to the same direction of torque; wherein the fore and after sides are compared by the moving direction of the radial arm and the inner and outer points by the radial line, and the longer fork branch is positioned on the fore side of the radial arm regardless been set moving clockwise or counterclockwise. In the same manner, the torque direction is revertible by overturning the fork branches of the radial arm for reverse connection, or otherwise by exchanging the relationship between the symmetric bore slots 116a and 116b in the bracket arms 111a and 111b and the asymmetric bores 117a and 117b in the fork branches 112a and 112b to exchange the fore and after fulcrums 117c and 117d. A stay 54 is jointed between the slightly loosened hinged cramp 55 on the fork-rooted radial arms 53 and the hinged slide cramp 56 at the vertical axle 5 to hold the radial arm 52, and a counter stay 133c is connected between the stay 54 and the vertical axial sleeve 110 at coupling cramp 133a and lug 133b to support and hold the loosened cramp 55 and the stay 54 without sliding off their support and yet allow the slightly loosened cramp 55 to release the centripetal and centrifugal component forces from the fork-rooted radial arm 53 to the fore and after eccentric fulcrums 117c and 117d for converting the centripetal and centrifugal component force to the same direction of torque, so that the fork-rooted radial arms 53 connected to the same slide hinged cramp 56 can be held at horizontal and radial status by bolting the hinged slide cramp 56 and be raised and lowered by removing the level 118 and the counter stay 133c. Therefore the objects of making recoverable fork-rooted radial arms and converting the useless and destructive centripetal and centrifugal component forces to a same torque direction are attained at a time.

Figure 6:
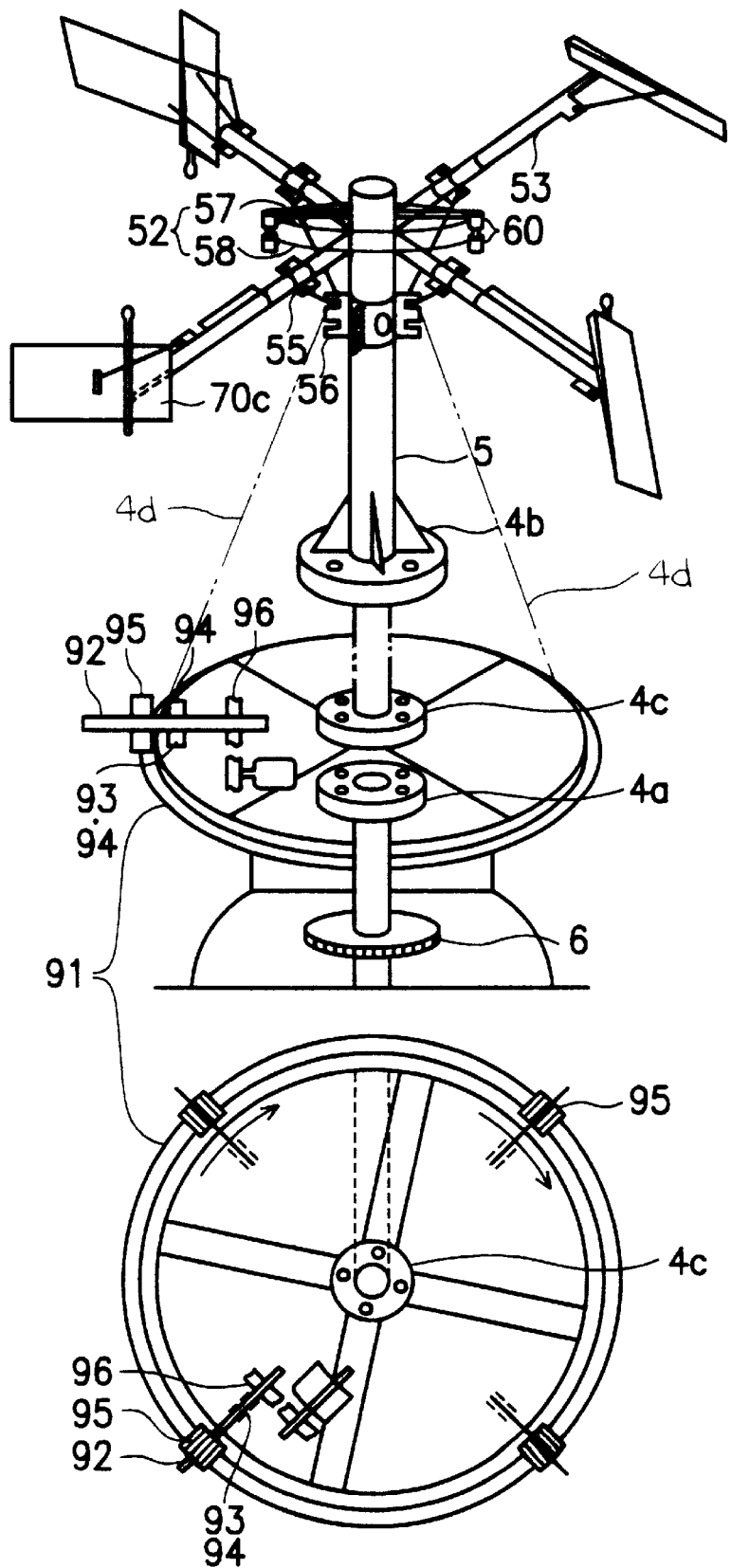
FIG. 6 is an enlarged view illustrating the relationship of the related components of the tilled or oblique blades, the rotary kinetic feed-back transmission and the machine room according to the above preferred embodiment of the present invention.

As shown in FIG. 6, a flywheel 4c provides a base for mounting the roller kinetic feed back transmission which contains a plurality of stays 4d and a plurality of caster rollers 95, in which the stays 4d are connected between the flywheel 4c and the vertical axle 5 to reinforce the tolerance of the turbine framework against strong wind, the circular rail 91 is mounted either on the roof of the machine room or on a separate ground frame or derrick to reinforce the tolerance of the turbine framework against strong wind, one of the caster rollers 95 is provided with a coaxial wheel 96 at the radial shaft 92 upon bearings 94 and brackets 93 on the flywheel 4c to feed back the rolling kinetic for output so that any control devices like an air or hydraulic compressor with related tools on the flywheel 4c will be operative in place of manual work to raise and lower the radial arms 53.

Figure 7:
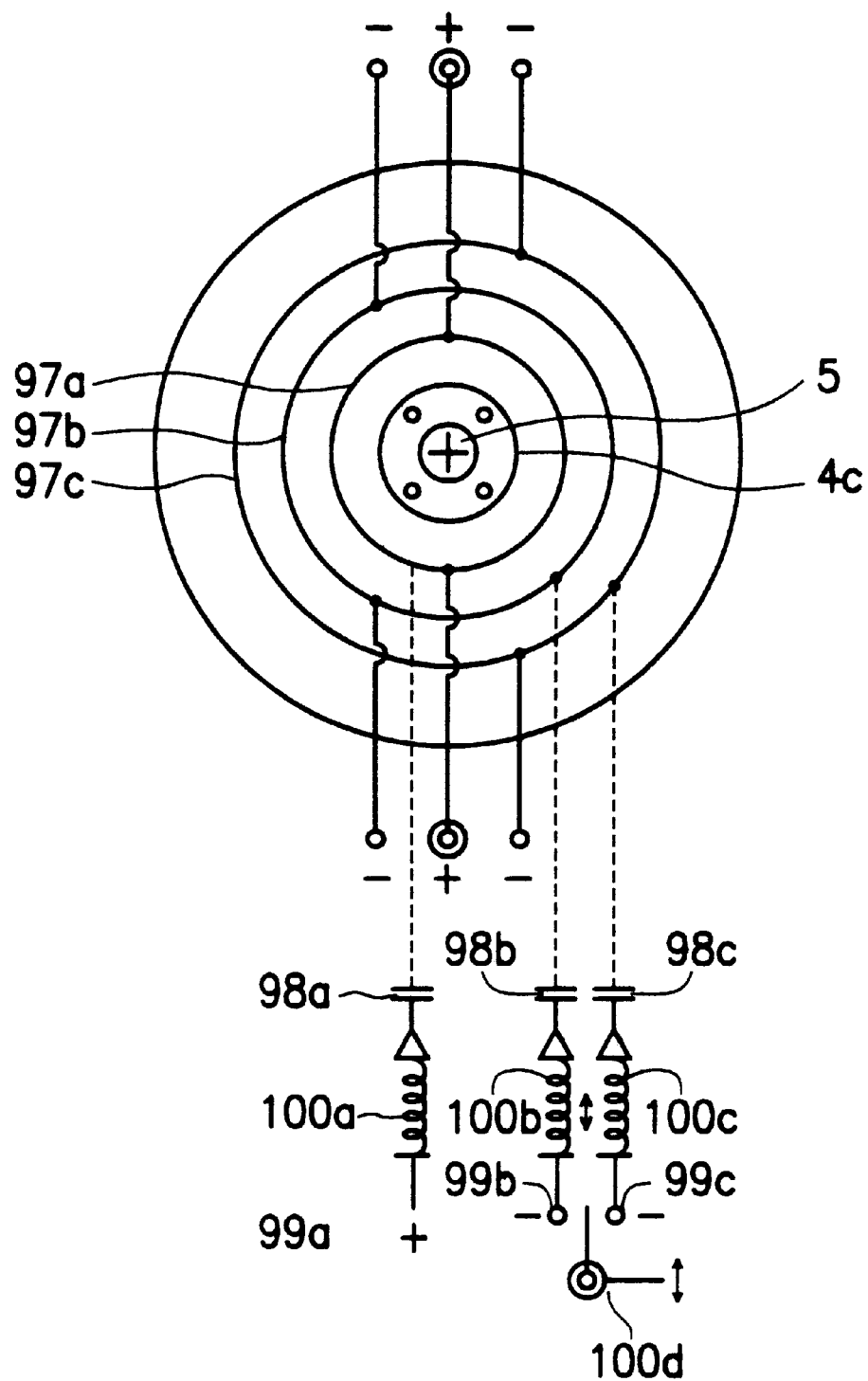
FIG. 7 is a bottom view of the circuit distribution between the rotational turbine framework and the fixed machine room according to the above preferred embodiment of the present invention.

As shown in FIG. 7, a circuit distribution and switching network comprises a plurality of isolated concentric circular conductive tracks 97a, 97b and 97c which are attached to the ceiling of the flywheel 4c, a plurality of control circuits distributed to the terminal or distribution kit of any control device like an air or hydraulic compressor on the flywheel, a plurality of coupling conductive slide contacts 98a, 98b and 98c supported by the brackets 99a, 99b and 99c and springs 100a, 100b and 100c on the roof of the machine room have direct contact to the relative conductive tracks 97a, 97b and 97c for connection and distribution of the control circuits from the fixed machine room to the rotary turbine framework under the control of the switch 100d. Additional concentric circular conductive tracks and corresponding slide contacts may be provided in the same manner for other devices such as illuminating and lightning rod grounding. Therefore, the object of making a dynamic and mechanized turbine framework is attained.

A plurality of oblique blades as shown in FIGS. 4c, 5a, 5b and 5c, comprise the blade elements 70a, 70b and 70c, a blade axis 64, a bushed sleeve axis 65, a bushed sleeve axis 88, an alternative bushed sleeve axis 90, an angle stay 66a, an alternative buffer stay 67a, a hinged cramp stop means 72, an alternative blade axis built-in stop and turn control device, and appropriate adjustable counterweight means.

Each of the blade elements 70a, 70b and 70c is divided into four wings (the wider-longer portion, the wider-shorter portion, the narrower-longer portion and the narrower-shorter portion) by a cross coordinate at the support point 80. Along the latitudinal axis of the cross coordinate, the after two wings (the wider-longer and wider-shorter portions) are portioned wider than the fore two wings (the narrower-longer and narrower-shorter portions) to let the two wider (after) wings (the wider-longer and wider-shorter portions) catch more wind streams than the two narrower (fore) wings (the narrower-longer and narrower-shorter portions) and perform as guide wings, and the two narrower (fore) wings (the narrower-longer and narrower-shorter portions) perform as counterbalancing wings. Along the longitudinal axis thereof, the outer two wings (the wider-longer and narrower-longer portions) are portioned longer than the inner two wings (the narrower-longer and narrower-shorter portions) to let the two longer wings (the wider-longer and narrower-longer portions) catch more wind than the two shorter wings (the wider-shorter and narrower-shorter portions) and perform as the master wings and the two shorter wings (the wider-shorter and narrower-shorter portions) perform as counterbalancing wings. Supplemental counterweight is distributed to the counterbalancing wings by adding thicker and heavier wing and frame materials than used for the guide wings. A longitudinal sleeve is secured at the support point 80 with a cut-off space between to separate it into joint sleeves 79b and 79c for jointing with a cross sleeve 79a of a blade axis. A projecting joint 86 is arranged at the secondary support point about a half length of the outer latitudinal axis. In addition, a tubular rib 81 is arranged along both shorter portions of the longitudinal and latitudinal axes, wherein the tubular rib 81 provides a slide way 82 and optional single-sided notches 83 for the counterbalancing rod 69 to slide along and been locked at an appropriate notch 82 by a bolt 84, so that a desirable balance condition at the support point 80 of the oblique blades can be easily attained and the object of making sensitive and light turn or swinging motion thereby under minor pressure is fulfilled.

The blade element 70a comprises a blade axis 64, a radial sleeve 65 and a stay 66a or a buffer stay 67a, wherein the blade axis 64 has a cross sleeve 79a at the outer end, a threaded portion 68 at the inner end, and the lug stop and joint 78 at the intermediate section thereof. The radial sleeve 65 has a projecting block 71 at a short distance from the outer end thereof. The blade axis 64 is inserted through the radial sleeve 65 till its lug stop and joint 78 been stopped by the outer end of the radial sleeve 65, and is pinned or bolted upon threads 68 at the inner end thereof to prevent it from sliding off the radial sleeve 65. The cross sleeve 79a is connected to the outer end of the blade axis 64 and is jointed between the longitudinal sleeves 79b and 79c by an axis 85.

A stay 66a has threaded connectors 66c at either end to adjust the length thereof and joints 66b at both ends and is jointed between the lug stop and joint 78 on the blade axis 64 and the projecting joint 86 at the secondary support point of the outer latitudinal axis of the blade element to tilt the blade element 70a to an adjustable angle below 45 degrees between the blade axis 64 and the latitudinal axis of the blade element 70a. An alternative buffer stay 67a contains a compression spring 67b and two counter sleeves 67c and 67d to replace the stay 66a. The compression spring 67b has a threaded connector 67e at either end to adjust the length thereof and joints 67f at both ends, has two counter sleeves 67c and 67d with coupling openings to wear one to another upon the compressing spring 67b and diminished necks to tightly hold the stems at both ends of the compression spring 67b to absorb destructive shocks and impacts from unstable wind and gusts and to protect the compression spring 67b from bend or deformation under pressure, and is jointed between the lug stop and joint 78 on the blade axis 64 and the projecting joint 86 at the secondary support point of the outer latitudinal axis of the blade element to tilt the blade element 70a to an adjustable angle below 45 degrees between the blade axis 64 and the latitudinal axis of the blade element 70a in the same manner as done for the stay 66a.

The bushed radial sleeve 65, when carrying the inserted blade axis 64 and the titled oblique blade element 70a, is inserted into the outer end of the radial arm 53 till the projecting block 71 slides along and rests at the turn end of the L-shaped slot 63 and till the projecting stop and joint 78 is stopped at the outer end of the radial arm at the same time.

Figure 4A:
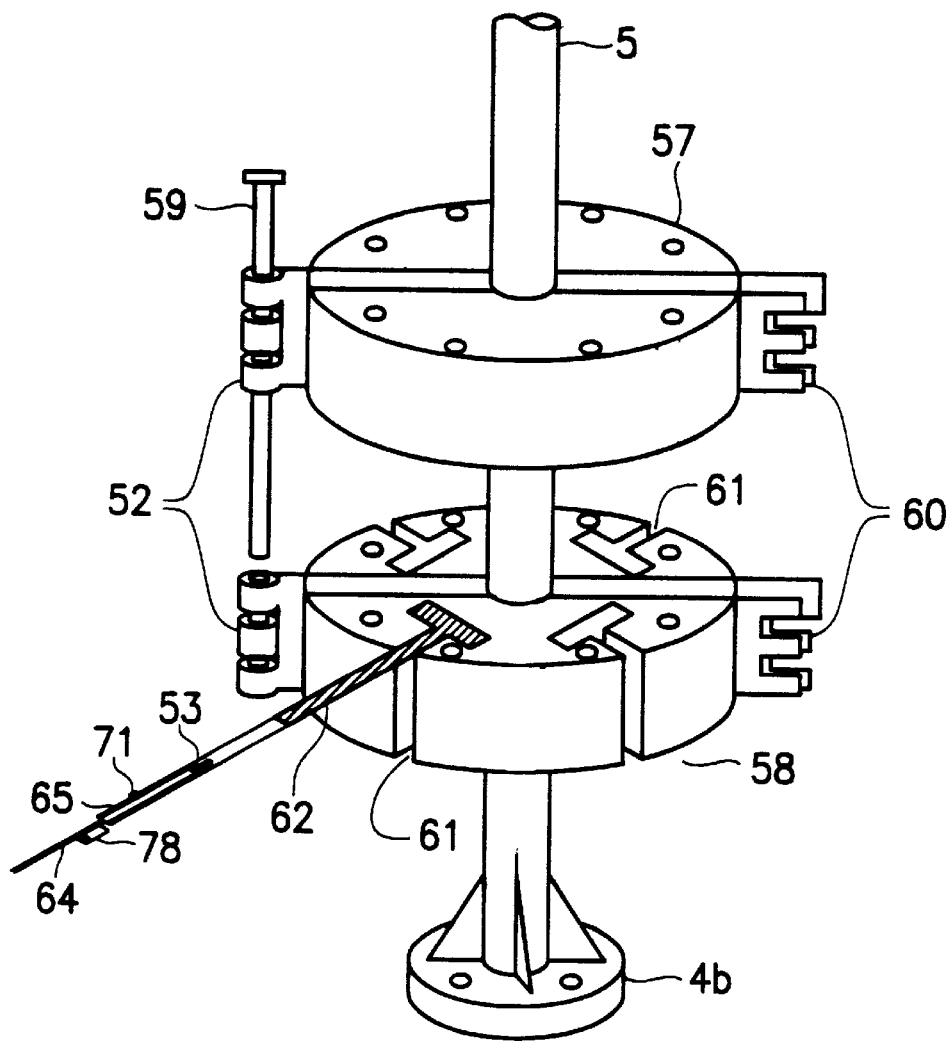
FIGS. 4a and 4b are the enlarged views of the turbine framework according to the above preferred embodiment of the present invention.
Figure 4B:
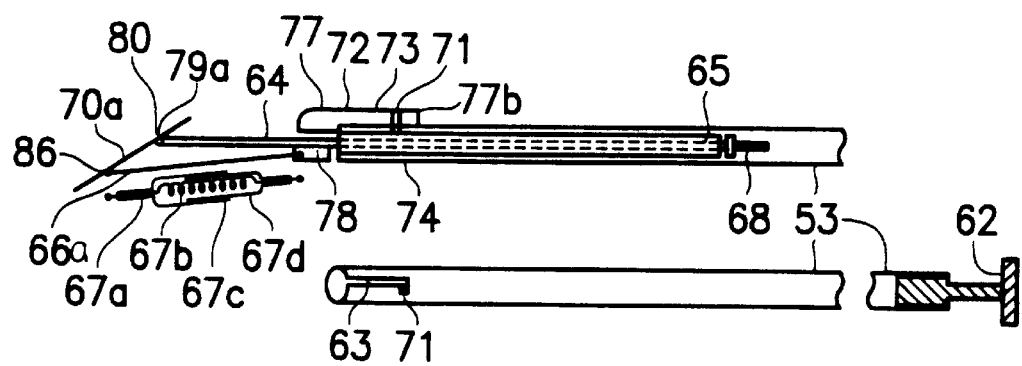
Figure 4C:
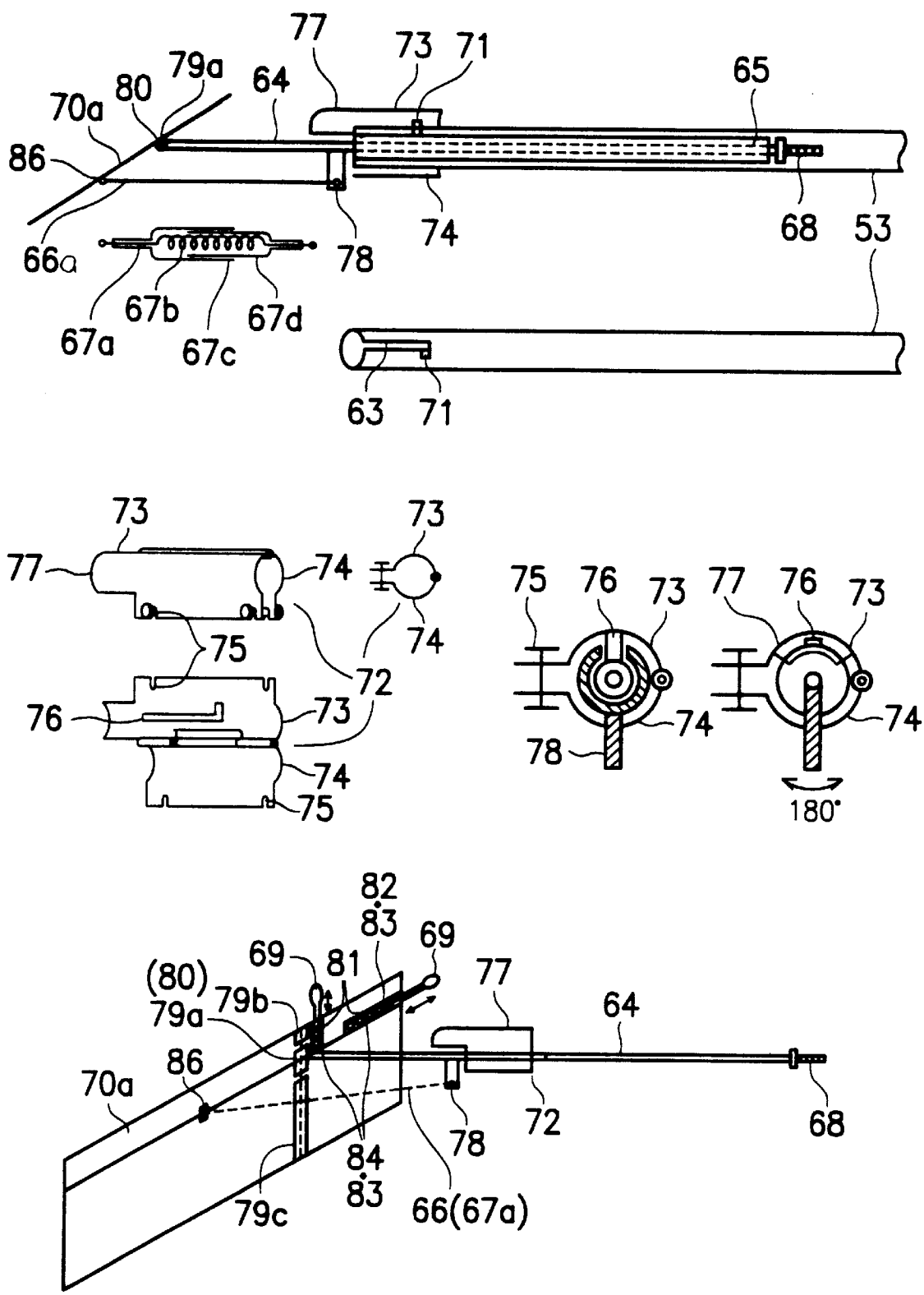
FIGS. 4c and 5a-1 are the enlarged views of the related components for the blade axis and the tilted or oblique blade according to the above preferred embodiment of the present invention.

As shown in FIG. 4c, the hinged cramp stop 72 contains two coupling tiles 73 and 74 both having corresponding lugs and notches 75 along the opening and been cramped and bolted at the outer end of the radial arm 53. The tile 73 has an optional internal L-shaped rib 76 corresponding to the L-shaped slot 63 to fill up the L-shaped slot when the cramp stop 72 is cramped at the radial arm 53 to prevent the bushed radial sleeve 65 and the blade axis 64 from sliding off the radial arm 53. The outer end of the tile 74 and the outer end of the radial arm 53 are aligned at the same section and the outer end of the tile 73 has a flanged lip stop 77 extending beyond the extremity of the radial arm 53 to cross and define the turn of the lug stop and joint 78 at the blade axis 64 within a range of 180 degrees and the turn of the tilted oblique blade 70a within the range of upstanding and overturned positions synchronously.

Figures 1, 5A:
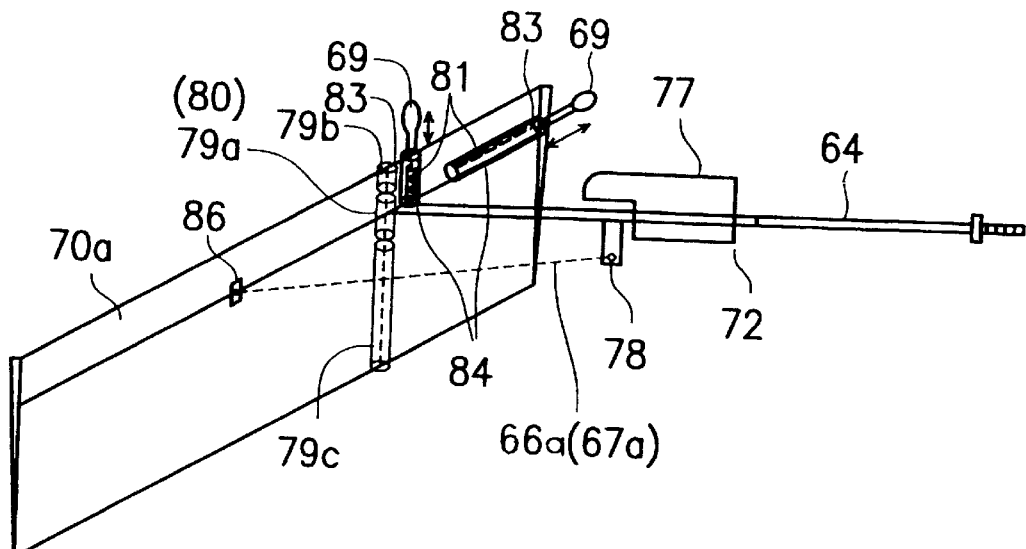
Figures 2, 5A:
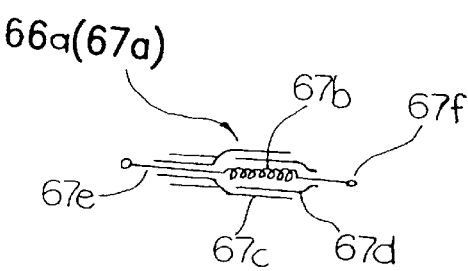
Figures 1, 5B:
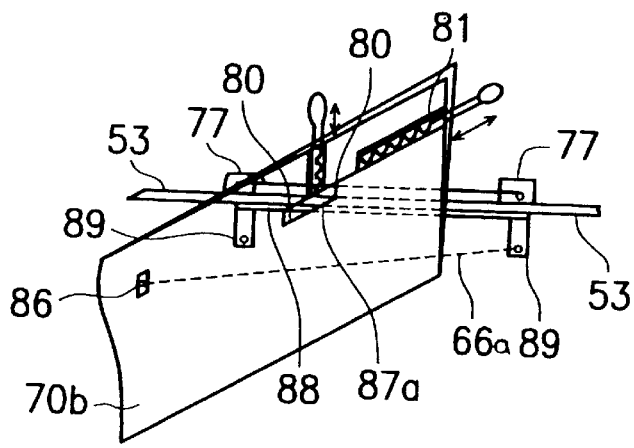
Figures 2, 5B:
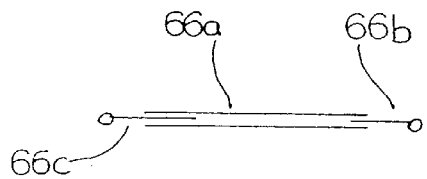

As shown in FIG. 5b, the oblique blade element 70b being modified from the oblique blade element 70a has a window 87a at the support point 80 thereof for insertion by and attachment to the bushed radial sleeve 88. The bushed radial sleeve 88 has a lug stop and joint 89 at each end, is directly and rigidly connected with the relative sides of the window 87a of the blade element 70b at the intermediate section thereof to save the blade axis 64, the cross sleeve 79a and the longitudinal sleeves 79b and 79c used for the blade 70a, or has an alternative sleeve 79a in side-crossing connection at its intermediate section for a serial joint between the alternative longitudinal joint sleeves 79b and 79c in the same manner as done for the blade element 70a to tilt the blade element 70b to an appropriate angle below 45 degrees. The bushed radial sleeve 88, when been attached by the blade element 70b, is worn over an appropriate site at either the outer portion or the intermediate portion of the radial arm 53, is baffled by the hinged cramp stop 72 at each end thereof to stop it from sliding toward either end, and is defined to turn within a range of 180 degrees and the turn of the oblique blade element 70b within the range of upstanding and overturned positions synchronously by the flanged lip stop 77 of the hinged cramp stop 72 against the lug stop and joints 89 at the bushed radial sleeve 88. Therefore, the bushed radial sleeve 88 is able to wear not only at the outer end, but also at the intermediate section of the radial arm 53, by which each radial arm 53 can carry more than one blade element 70b at a time. Apparently a greater expandability for making a heavy-duty turbine becomes possible and easier.

Figure 5C:
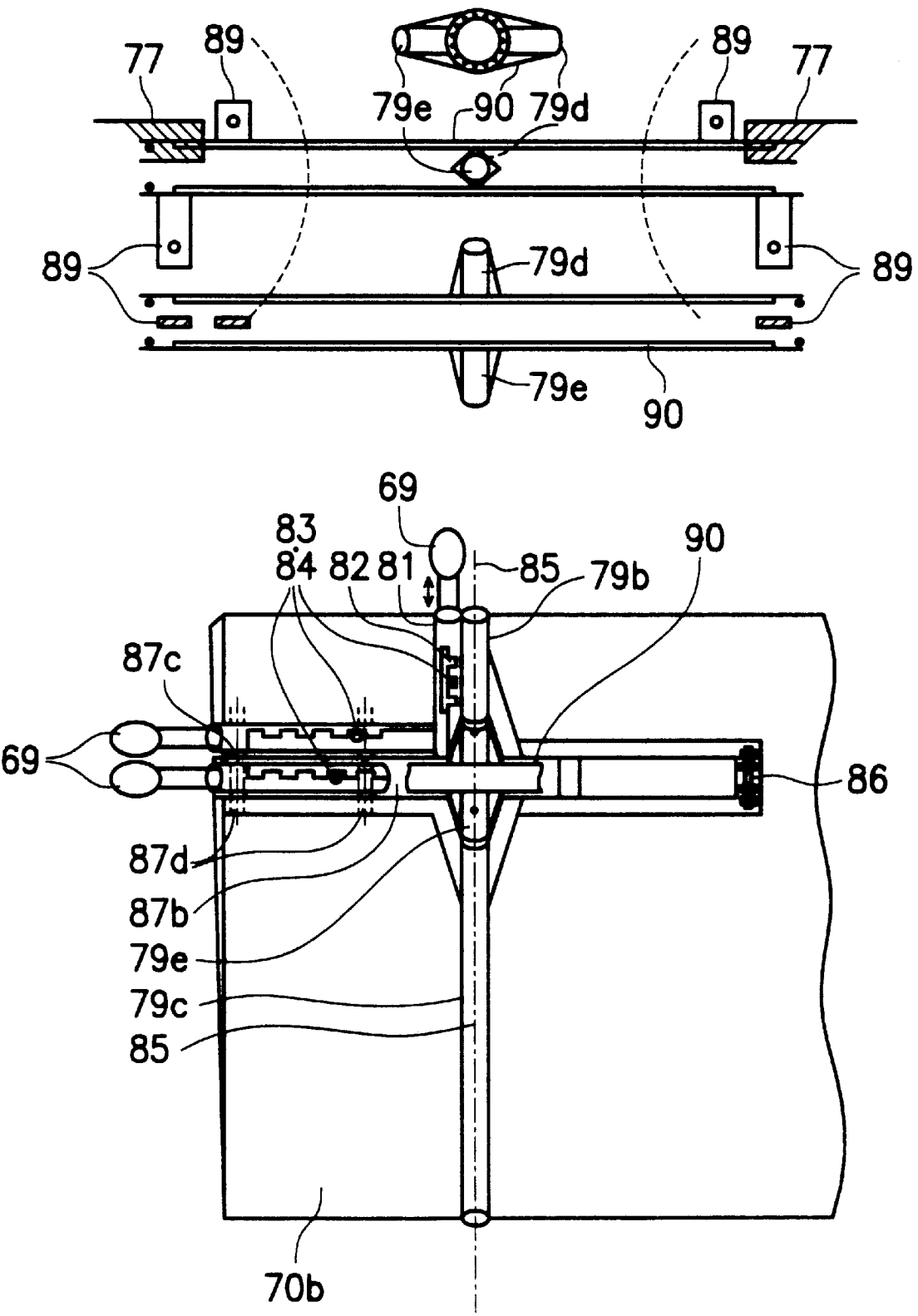
FIG. 5c illustrates in detail the relationship of the components of the bushed cross axial sleeve of the tilted or oblique blade.

As shown in FIG. 5c, the oblique blade element 70c being modified from the oblique blade element 70b has an opening 87b along the inner portion of the latitudinal axis to replace the window 87a in the blade element 70b. A bushed radial sleeve 90 has either the cross sleeve 79a in side-crossing connection at its intermediate section or the sleeves 79d and 79e in symmetric side cross connection on relative sides of the intermediate section thereof to couple with the longitudinal sleeves 79b and 79c for serial joint thereto, has the projecting lug stop and joint 89 at both ends on relative sides thereof, and is worn at an appropriate site upon the coupling radial arm 53. The bushed radial sleeve 90, when been attached by the blade element 70c, is worn at an appropriate site upon either the outer portion or the intermediate portion of the radial arm 53, is baffled by the hinged cramp stop 72 at each end to stop it from sliding toward either end, and is defined to turn within a range of 180 degrees and the turn of the oblique blade element 70c within the range of upstanding and overturned positions synchronously by the flanged lip or stops 77 against the lug stop and joints 89 in the same manner as arranged for the blade element 70b. The stay means of either the stay 66a or the buffer stay 67a is connected between the inner lug and joint 89 of the bushed radial sleeve 90 and the coupling joint 86 at the secondary support point of the blade element 70c in the same manner as done for the blade elements 70a and 70b to tilt the blade element 70c to an appropriate angle below 45 degrees. Therefore, not only more than one blade element 70c can be worn to the radial arm 53, but also any of them is removable from the opening 87b without the necessity of sliding it off the radial arm 53. Furthermore, the longer wings of the blade element 70c are adjustable between upward and downward tilting merely by swinging the shorter wings of the blade element 70c across the opening 87b to the opposite side of the radial arm 53 and by removing the stay means to the coupling joints on the reverse side thereof without the necessity of sliding the whole blade 70c off and refitting it onto the radial arm 53. The tubular rib 81 with the slidable rod 69 therein is hinged and latched at the opening 87b by hinges 87c and latches 87d to fill up the opening 87b, which is open only when an adjustment of the oblique direction for the blade 70c is in progress. Apparently the oblique blade element 70c provides an additional convenience to choose either upward or downward tilting for catching either elevating or falling wind at some particular sites and time.

As shown in FIGS. 10a, 10b, 10c, 10d and 10e, a blade axis built-in stop and turn control device comprises a fixed part and a movable part and is worn to an appropriate site of the coupling radial arm 53, wherein the fixed part contains a radial sleeve 119a, a collar baffle 121 and the half-cut collar baffles 125a and 125b, and the movable part contains the bushed radial sleeve 120a and the collar wheeler 122. In the fixed part, the radial sleeve 119a is worn to and bolted at a cross bore 119b in the radial arm 53 by a bolt 119c and is connected by the collar baffle 121 at the outer end thereof. The collar baffle 121 has an outward rim 126, cross bores 127a about the rim 126 and an outward fan-shaped block 129 inside the rim 126. In the movable part, the radial sleeve 120a has internal bushes 120b and is connected by a collar wheeler 122 at the inner end thereof The collar wheeler 122 has an inward fan-shaped block 130 to couple with the fan-shaped block 129 on the same block alignment inside the rim 126 making a counter block range of 180 degrees to provide the collar wheeler 122 with a free turning range of 180 degrees inside the rim 126. The half-cut collar baffles 125a and 125b have a cross bore 127b corresponding to the cross bores 127a in the rim 126 and are covered and bolted to the rim 126 to enclose and baffle the collar wheeler 122 from detaching and sliding off the fixed part and the radial arm 53. The lug joint 131 with a bore 132 is connected to relative sides close to the collar wheel 122 and on the central line of the turning range thereof.

Accordingly the radial sleeve 120a is able to have its inner end bolted at the end portion of the radial arm 53 and to have its outer end connected by the blade axis 123 with the cross sleeve 124 (79a) at the extremity thereof for jointing with the corresponding longitudinal sleeves 79b and 79c in the blade elements 70a, 70b or 70c, or alternatively to have its inner end bolted at an appropriate site of the radial arm 53 and to have its outer end connected by the sleeve 79a in side-crossing connection or by the sleeves 79d and 79e in symmetric side cross connection for jointing with the corresponding longitudinal sleeves 79b and 79c in the blade elements 70b or 70c. An optional set of the collar wheeler 122 is connected to the outer end of the bushed radial sleeve 120a of the movable part for adding a counter collar baffle 121 of the radial sleeve 119a of the fixed part, which is symmetrically secured at the radial arm 53 as an option to share the load thereby or to replace the inner set of the bushed radial sleeve 120a. A stay means of either the jack stay 66a or the buffer stay 67a is connected between the lug joint 131 at the radial sleeve 120a and the lug joint 86 at the secondary point of the blade element 70a, 70b or 70c. Apparently the blade axis built-in stop and turn control device has greater compatibility for mounting at any site on the radial arm 53 and jointing to any of the blade elements 70a, 70b and 70c by corresponding sleeve couplers and longitudinal axes 85, and the object of simplifying and securing the mounting operation is attained.

For achieving sensitive identification of and swinging against the alternation of lee wind and head wind to maximize the sailing range and minimize the windward range along the circular course, appropriate tilting angle of the blade is a major concern in addition to appropriate division of the blade elements and to an arrangement of counterbalancing means as above described. Although the acceptable sailing range of the blade can reach 270 degrees by tilting its angle up to 45 degrees according to the basic sailing techniques, the tilting angle is set at 35 degrees as an example for the present invention and is adjustable by adjusting the length of the stay 66a and the buffer stay 67a to change every two degrees of sailing range by adjusting one degree of tilting range.

Figure 8:
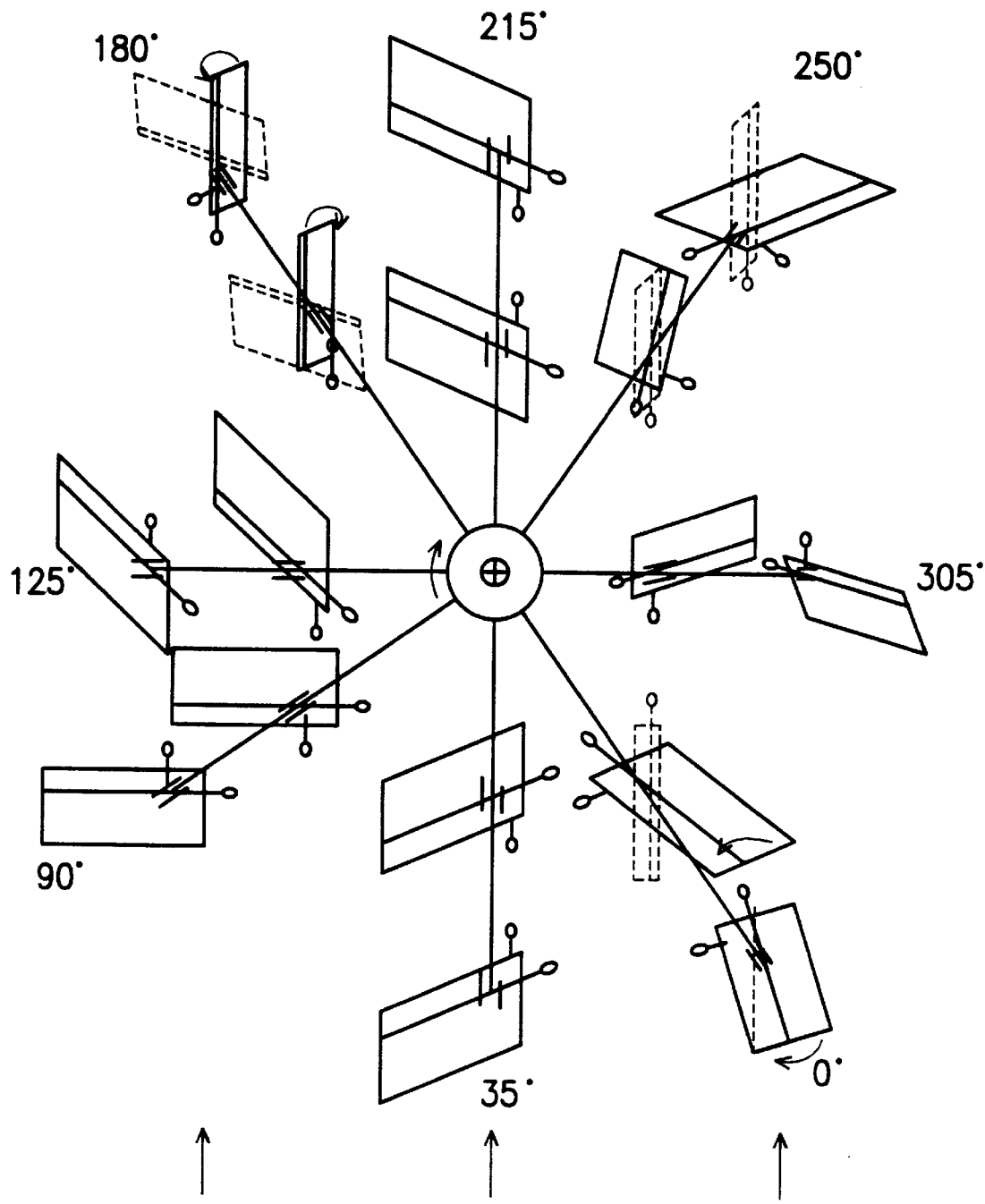
FIG. 8 is a schematic view of the blade elements upon the radial arm in all directions about the rotational turbine according to the above preferred embodiment of the present invention.
Figure 9A:
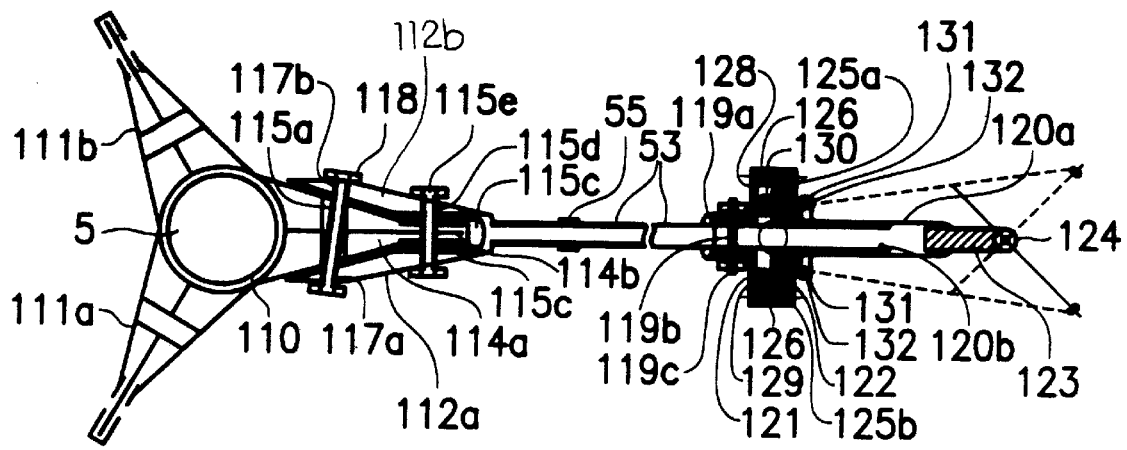
FIG. 9a is a partial sectional top view of the eccentric-guided torque conversion means of centripetal and centrifugal forces by the angular bracket attached by the fork-rooted radial arm and the blade axis built-in stop and turn control device according to the above preferred embodiment of the present invention.
Figure 9B:
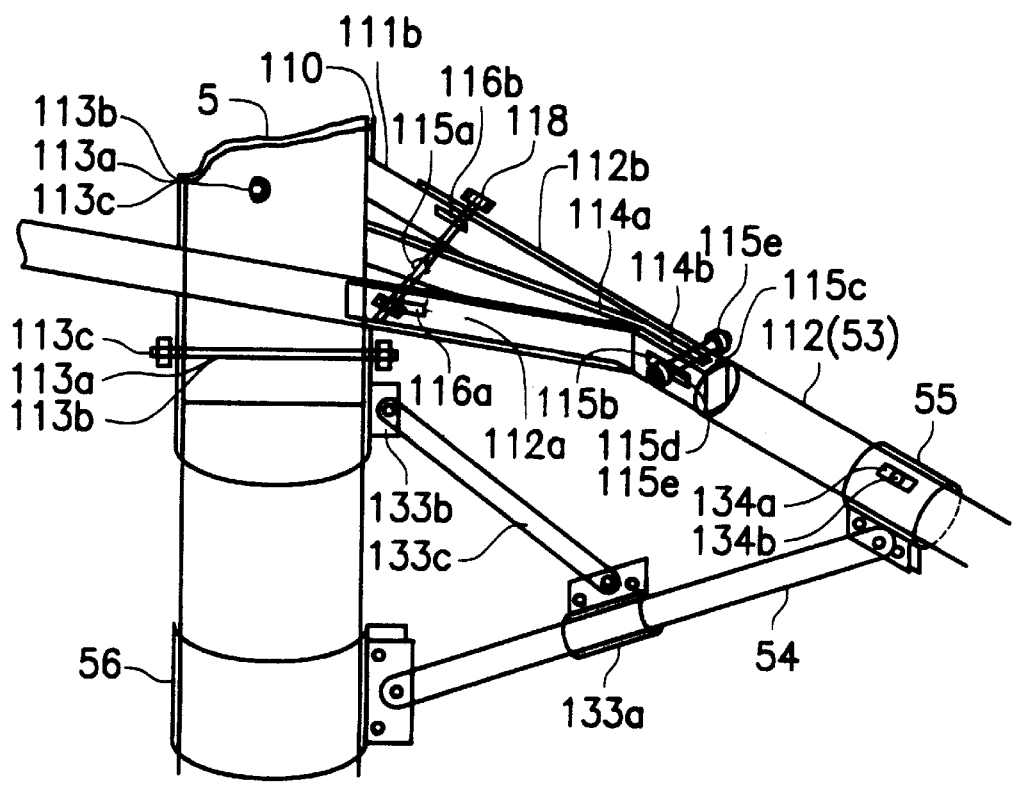
FIG. 9b is a perspective view of the fork-rooted radial arm supported by the angular bracket, the jack stay and the angle stay according to the above preferred embodiment of the present invention.
Figure 9C:
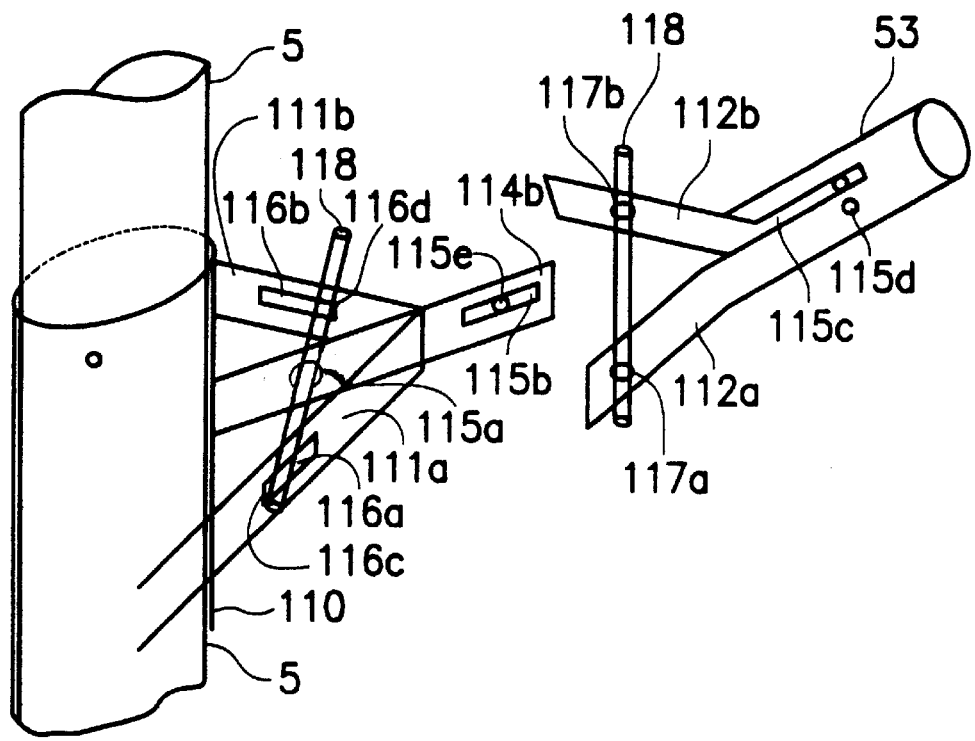
FIGS. 9c and 9d are schematic views illustrating the relationship between the angular bracket and the fork-rooted radial arm according to the above preferred embodiment of the present invention.
Figure 9D:
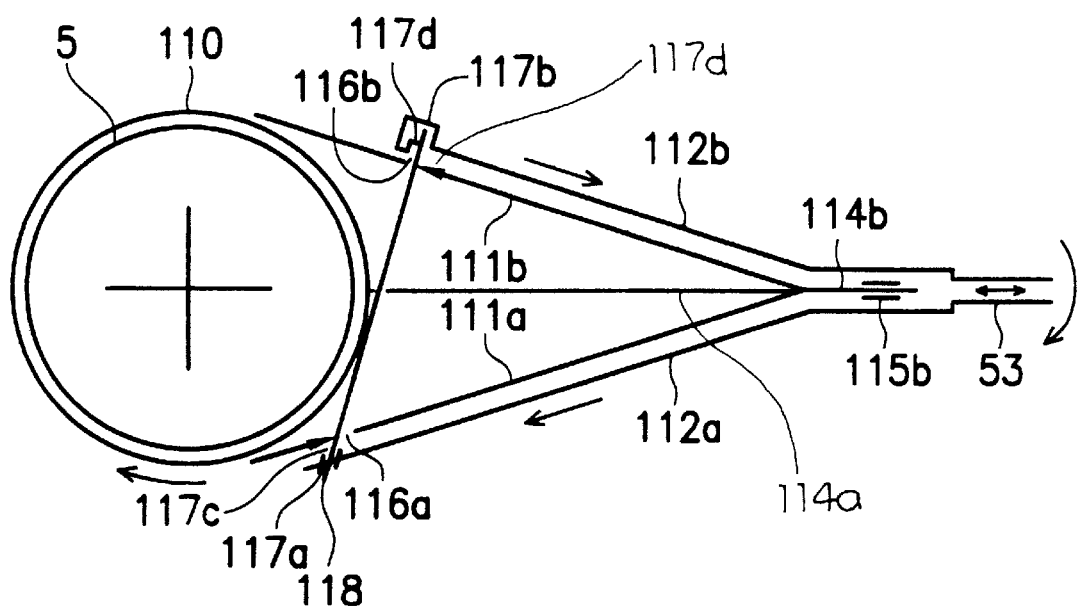
Figure 10A:
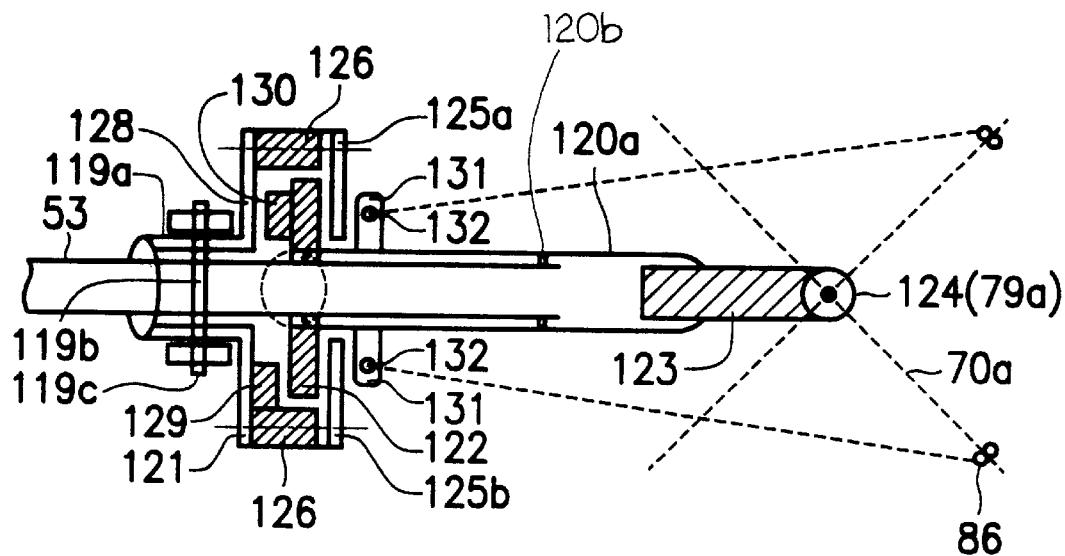
FIG. 10a is a sectional view of the blade axis built-in stop and turn control device attached by an optional blade axis with a cross sleeve at the outer end thereof according to the above preferred embodiment of the present invention.
Figure 10B:
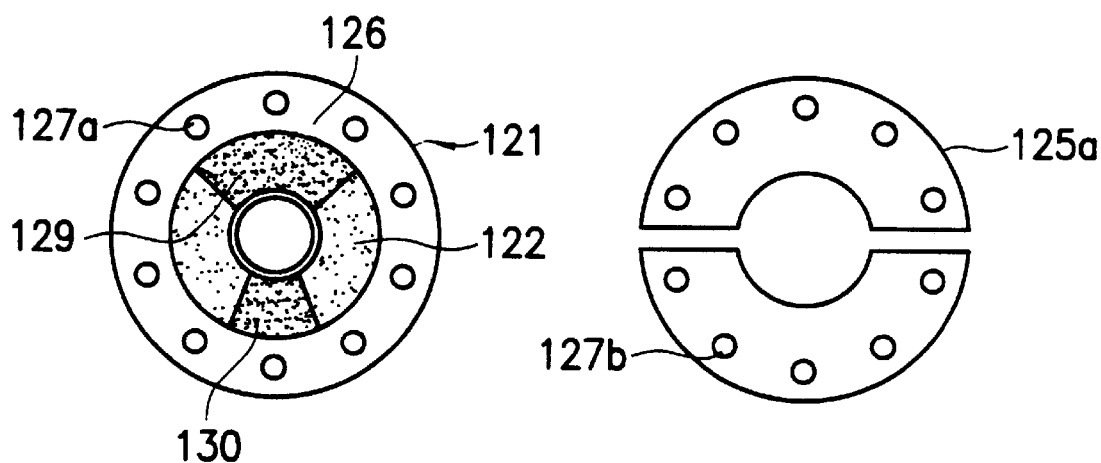
FIG. 10b is the right side sectional view of the blade axis built-in stop and turn control device according to the above preferred embodiment of the present invention.
Figure 10C:
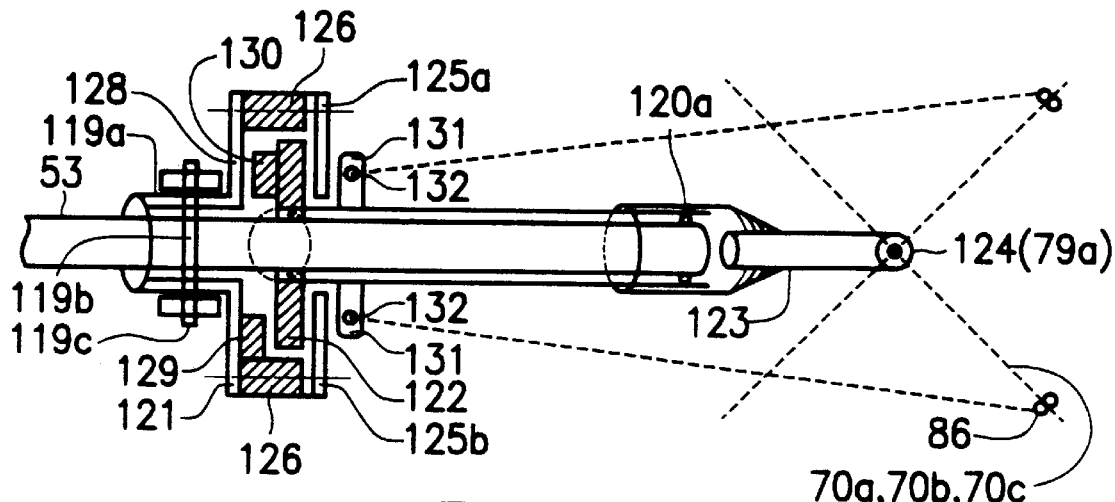
FIG. 10c is a sectional view of the blade axis built-in stop and turn control device attached in another manner by the optional blade axis with the cross sleeve or joint at the outer end thereof according to the above preferred embodiment of the present invention.
Figure 10D:
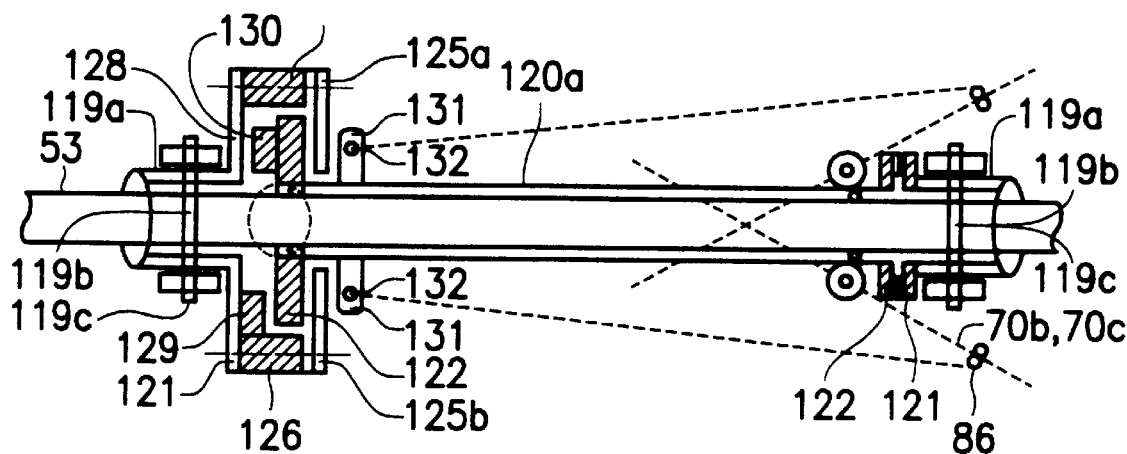
FIG. 10d is a sectional view of the blade built-in stop and turn control device attached by the optional side-crossing sleeves and an optional symmetric built-in stop and turn control device according to the above preferred embodiment of the present invention.
Figure 10E:
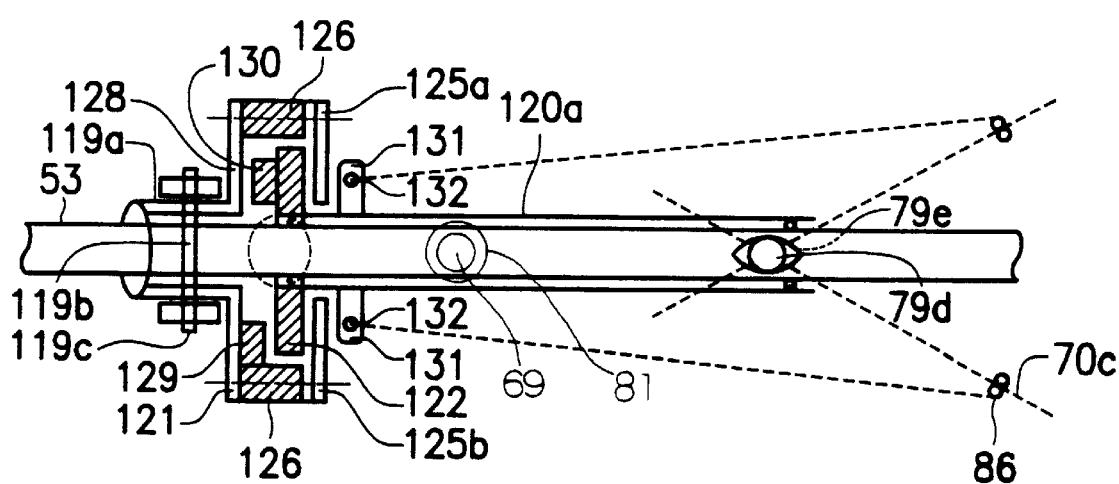
FIG. 10e is a sectional view of the blade built-in stop and turn control device attached by the optional symmetric right side cross sleeves 79d and 79e on relative sides of the radial arm sleeve according to the above preferred embodiment of the present invention.

For better understanding of the merits and advantages of the oblique blades 70a, 70b and 70c and the eccentric-guided torque conversion means of centripetal and centrifugal component forces, a conceptual points of sailing as shown in FIGS. 8 and 9d are illustrated under the following conditions:

The arrows indicate the wind, force and rotational directions. The oblique angle for the blades are set at 35 degrees and both blades are appropriately portioned and counterweighted as above described. The angular bracket and the fork-rooted radial arm are not included, but the effect of the eccentric-guided torque conversion of the centripetal and centrifugal component forces can be referred to and understood from aforesaid illustration for FIG. 9d. The eight positions show the operative manner or status and are applicable for any blade on the fork-rooted radial arm. The blade 70b or 70c is set inside and pointing upward and the blade 70a outside and pointing downward at the radial arm 53. The guide wing of the blade 70b or 70c (hereinafter referred to the wing 70b) and the guide wing of the blade 70a (hereinafter referred to the wing 70a) are set on the after side of the radial arm 53. When the radial arm points 35 degrees to the lower right of FIG. 8, the wing 70a points 35 degrees downward and the wing 70b points 35 degrees upward, both having 35 degrees of lee angle against the wind, wherein the up-pointing wing 70b is pressed to swing 90 degrees upward till it is stopped at its overturned position by relative stop means and the down-pointing wing 70a to swing 90 degrees downward till it is stopped at its upstanding position by relative stop means the same time, wherein both wings 70b and 70a begin pointing 35 degrees forward of the radial arm and become parallel to the wind, where they are pushed clockwise by the blades on other radial arms 53 and start moving forward from zero degree lower right and broadening their lee angle to load the wind with strengthening tangential and centripetal component forces upon the fore fulcrum 117c of the radial arm to sail forward.

When the radial arm 53 approaches to the position straight down, both blades have sailed for 35 degrees and broadened their lee angle up to 35 degrees with considerable tangential component force and the maximum centripetal component force sent to the radial lug 114b and the fore eccentric fulcrum 117c to produce driving torque. When the radial arm approaches to the position lower left after they sail up to 90 degrees, both blades become vertical to the wind and are fully loaded with maximum tangential component force and minor centripetal component force to drive the radial arm forward.

After that site, they gradually narrower their lee angle till sailing up to 180 degrees up left, where their lee angle has narrowed down to zero degree with their outer wings parallel with the wind and pointing downwind to cease driving. Therefore, they are pushed forward by the blades on other radial arms, and in turn their opposite sides or the angle stay sides are pressed by relative wind and immediately swing for 180 degree till the wing 70b swings down and is stopped at its upstanding position and the wing 70a swings up and is stopped at its overturned position, wherein both wings are offered an additional lee angle about 70 degrees to reload the wind by their opposite sides with maximum centrifugal component force and moderate tangential component force sent to the radial lug 114b and the after fulcrum 117d to continue sailing forward.

Thereafter they gradually narrow their regained lee angle and weaken their tangential and centrifugal component forces till sailing up to 250 degrees upper right where both blades are again parallel to the wind to cease driving and are pushed forward by the blades on other radial arms. Then both guide wings are pushed by relative wind and instantly swing downwind with the wing 70b pointing 35 degrees upward and the wing 70a pointing 35 degrees downward to streamline against the head wind till their return to the zero degree at their start position lower right, wherein they have completed their first circle of sailing and are ready to load wind and restart the next circle of sailing in the same manner.

When duplicated angular brackets and coupling fork-rooted radial arms are mounted on the vertical axle 5 to carry duplicated blade elements 70a, 70b and/or 70c at the end portions and intermediate portions thereof, a continuous or cyclic rotation is produced by both the converted single torque direction of the centripetal and centrifugal component forces and when they are linked with the highly efficient transmission means and the automatic rotary speed regulating means as above described, the objective of achieving a highly efficient heavy-duty windmill and producing good quality of mechanical power at a time is assured.

However an agreement for two and more oblique blades at respective radial arms upon the same vertical axle 5 as shown in FIGS. 1 and 8 must be so met that when the projecting stops and joints at respective blade axes are put at the middle of the defined turn range of 180 degrees, the wider and longer wing of respective oblique blades as above divided and described must be set on the after side and the longer fork branch be positioned on the fore side of respective radial arms at the same time regardless they are tilted either upward or downward and are set sailing clockwise or counterclockwise. Any disagreement or contrariety against the above defined shall lower or offset the duly secured driving force by the turbine.

The forgoing description of the embodiment and accompanying drawings of this invention is susceptible of various changes in the form, proportion, directions, sides and minor details of construction. Therefore any modification or imitation of such without departing from the principle or sacrificing any of the advantages and the nature thereof is duly within the scope of what are claimed herein.

What is claimed is:

1. A vertical-axle wind power machine comprising:
   a multipurpose turbine framework which comprises a vertical axle and a plurality of radial arms secured to said vertical axle;

a plurality of sets of oblique blades respectively mounted on said radial arms of said multipurpose turbine framework, wherein said oblique blades are divided into four wings by a cross coordinate at the support point thereof; along the latitudinal axis the after two wings portioned wider than the fore two wings leaving said two wider wings performing as guide wings and said two narrower wings performing as counterbalancing wings, and along the longitudinal axis the outer wings portioned longer than the inner two wings leaving said two outer wings performing as master wings and said two inner wings performing as counterbalancing wings, is provided with appropriate counterweights in the counterbalancing wings to maintain a balance condition at said support point thereof, is tilted to an adjustable angle below 45 degrees from the radial blade axis upon said radial arm by adjusting the length of stay means jointed between said radial blade axis and said support point thereof, and is defined to swing within a range of 180 degrees between the upstanding and overturned positions thereof by appropriate stop means; and a multiplying transmission comprises a pair of paralleled vertical shafts and pairs of bushed multiplying gears serially coupling between said paralleled vertical shafts to multiply low speed rotary motion transmitted from said vertical axle to high speed rotary motion for an output.

2. A vertical-axle wind power machine, as recited in claim 1, wherein the multipurpose turbine framework comprises a plurality of jointing brackets, a plurality of jointing radial arms, a plurality of stay means, a plurality of hinged slide cramps, and a plurality of cramps; said jointing brackets each jointed at said vertical axle to support said jointing radial arms, said stays each jointed between said hinged slide cramp upon said vertical axle and said cramps upon said radial arms to raise and lower said radial arms at a same set of said jointing bracket by sliding said hinged slide cramp up and down and to hold the same in horizontal status by tightening said hinged slide cramp upon said vertical axle.

3. A vertical-axle wind power machine, as recited in claim 2, wherein the jointing bracket being a hinged wheel bracket comprises a lower hinged cramp and an upper hinged cramp both with corresponding curves to cramp said vertical axle, corresponding lugs and notches at the opening, a coaxial hinge engagement, and corresponding vertical bores around; said lower hinged cramp having a plurality of T-shaped anchor slots evenly spaced around and each of said T-shaped anchor slots having a tangential slot inside and a radial opening outward; said upper hinged cramp being covered and bolted upon said lower hinged cramp to enclose and secure T-shaped joints of said radial arms therein to provide said T-rooted radial arms with a free swinging motion between a horizontal and hanging scope without dropping therefrom.

4. A vertical-axle wind power machine, as recited in claim 2, wherein the jointing bracket being an multiple-angular bracket comprises an axial sleeve base and a plurality of angular brackets, said axial sleeve base worn and secured at said vertical axle, said angular brackets each having an internal radial girder extending through the angular tip to form a radial lug and connected to said axial sleeve base, said radial girder having a bore in its inner end and a bore slot in said radial lug thereof, both arms of said angular bracket having a pair of symmetric bore slots on relative sides of said bore at said radial girder; a fork-rooted stem with a radial opening between two fork branches at unequal length, said radial opening having a cross bore, said fork branches having asymmetric bores at said fork extremities, said radial opening in said fork stem jointed upon said radial lug at said angular bracket by an axis through said cross bore in said stem and said bore slot in said lug providing said fork-rooted stem with a free slide motion along said bore slot in said lug and with a free swinging motion upon said axis, a lever inserted to cross said asymmetric bores in said fork branches and said symmetric bore slots in said bracket arms via said bore in said radial girder to hold said fork-rooted stem in horizontal status, resulting that when said axis is seated amid said bore slot in said lug, one end of said lever at said longer fork branch being firmly resisting at the inner end of said bore slot in said longer (fore) bracket arm and the other end thereof at said shorter (after) fork branch at the outer end of said bore slot in said shorter (after) bracket arm at the same time; and said fork-rooted stem further held in horizontal status by said tubular cramp slightly loosened at said stay means to provide said fork-rooted stem with a free slide motion and by a counter stay means connected between said vertical axle and said stay means to prevent said loosened tubular cramp from sliding off its support.

5. A vertical-axle wind power machine, as recited in claim 2, wherein the jointing radial arms each contains an optional L-shaped slot at the end portion and a T-shaped anchor at the root portion to joint with and enclosed in said T-shaped slot of said hinged wheel bracket.

6. A vertical-axle wind power machine, as recited in claim 2, wherein the jointing radial arms each contains an optional L-shaped slot at the end portion and a fork-rooted stem at the root portion to joint with and latched in said angular bracket.

7. A vertical-axle wind power machine, as recited in claim 1, wherein the multipurpose turbine framework further comprises a flywheel and a plurality of stays, said flywheel sandwiched between the disc pedestal of said vertical axle and the disc bracket of said vertical master shaft at the hub thereof, and said stays secured between said vertical axle and said flywheel.

8. A vertical-axle wind power machine, as recited in claim 1, wherein the multipurpose turbine framework further comprises a flywheel, a plurality of stays, a circular rail, a plurality of rollers, and a roller kinetic feed back mechanism; the flywheel sandwiched between the disc pedestal of said vertical axle and the disc bracket of said vertical master shaft at the hub thereof, the circular rail mounted on a supporting frame under said flywheel, said caster rollers mounted about said flywheel to run upon said circular rail, and one or more of said rollers provided with a coaxial output wheel.

9. A vertical-axle wind power machine, as recited in claim 1, wherein the multipurpose turbine framework further comprises an appropriate number of concentric circular tracks, coupling conductive slide contacts, distributive circuits and switch means; said concentric circular tracks isolated from and secured at the ceiling of said flywheel, said conductive slide contacts held in slide contact respectively along said coupling concentric circular tracks over the roof of said machine room, and said distributive circuits and switch means connected between said concentric circular tracks and appropriate appliances on said flywheel and between said conductive slide contacts and appropriate devices in and away from said machine room.

10. The vertical-axle wind power machine, as recited in claim 1, wherein the rotary speed multiplying transmission further comprises a friction-rewarding multiplying transmission comprises a master vertical shaft, a coupling vertical shaft, a master driving gear, pairs of bushed united multiplying gears, and a clutch; wherein the master vertical shaft and the coupling vertical shaft secured in parallel in a machine room, a top of said master vertical shaft extending to the roof of said machine room and connected to said disc bracket with vertical bolts, said master or first driving gear attached to and pinned at the support point of the hub upon a slide way on an upper portion of said master vertical shaft for keeping synchronous rotation with and being able to slide along said slide way at said master vertical shaft, a first pair of said bushed united multiplying gears including a first driven gear and a second driving gear attached to said coupling vertical shaft to let said first driven gear couple with said master driving gear, a second pair of said bushed united multiplying gears including a second driven gear and a third driving gear attached to said master vertical shaft, said second driven gear been coupled with said second driving gear of said first pair of said bushed united multiplying gears, a third pair of said bushed united multiplying gears including a third driven gear and a fourth driving gear, said third driven gear coupled with said third driving gear of said second pair of said bushed united multiplying gears, and said fourth or last driving gear of said third or last pair of said bushed united multiplying gears being replaceable with a conical friction wheel when performing as a regulating wheel for coupling with a next friction wheel, any of said coupling gears being replaceable by conversely linked belt wheels.

11. The vertical-axle wind power machine, as recited in claim 10, wherein the friction-rewarding rotary speed multiplying transmission further comprises a rotary speed regulating mechanism which contains a conical friction wheel, a fluted guide spindle, a slide friction wheel, a coaxial output wheel and a U-shaped fork clamp; said conical friction wheel arranged to replace said last driving gear of said last pair of said bushed united multiplying gears, said fluted guide spindle mounted in parallel with the ridge of said conical friction wheel and having a slide way corresponding to the length of the ridge thereof, said slide friction wheel pinned at a said slide way on said fluted guide spindle and coupled with the ridge of said conical friction wheel, said output wheel being in coaxial connection and synchronous rotation with said fluted guide spindle, and said U-shaped fork clamp having a sleeve coupler and two arms each with a fork to clamp relative sides of said slide friction wheel on one hand and to clamp relative sides of said fluted guide spindle on the other hand.

12. The vertical-axle wind power machine, as recited in claim 11, wherein the rotary speed regulating mechanism further comprises a wind-operated rotary speed regulator which contains a slide guide lever, a compression spring, a guide wire, a wind shield, a slide horizontal level, a regulator compression spring, a T-shaped tubular support, a bushed upstanding tubular base, an appropriate number of fixed pulleys, an extension spring and a spring shelter; said slide guide lever having a threaded portion at one end and a bore at the other end, supported by the bushed brackets to parallel with said fluted guide spindle of said rotary speed regulating mechanism and attached by a sleeve coupler of said U-shaped fork clamp of said rotary speed regulating mechanism; said compression spring worn over said slide guide lever from a threaded portion thereof and adjusted by a nut till stopped by a closer bushed bracket and the elasticity thereof to pull said U-shaped fork clamp and said slide friction wheel to the bigger end of said conical friction wheel; said wind shield secured at a fore section of said slide horizontal level and a after section thereof inserted through a corresponding nozzle and a cylinder of the horizontal tube of said T-shaped tubular support; said regulating compression spring worn over said after section of said slide horizontal level in said cylinder and adjusted to appropriate elasticity by a piston nut at said threaded after end of the said horizontal lever; said upstanding tubular spindle of said T-shaped tubular support inserted through said bushed upstanding tubular base and fastened at a lower end of said upstanding tubular base; said fixed pulleys secured along a recessed tunnel under said cylinder, said bushed upstanding tubular spindle in said upstanding tubular base and appropriate sites to lead said guide wire from the bored end of said slide horizontal lever to said bored end of said slide guide lever of said rotary speed regulating mechanism; said extension spring being in serial connection with said guide wire; and said sleeve worn upon said extension spring and rigidly braced or positioned to protect and define said extension spring from moving beyond an allowed distance.

13. The vertical-axle wind power machine, as recited in claim 12, wherein the rotary speed regulating mechanism further comprises an alternative rotary speed regulating means, which contains a worm guide spindle, a stop means, a control wheel, and a bi-directional motor; said worm guide spindle arranged to take the place and the job of said slide guide lever of said wind operated rotary speed regulator, attached by said U-shaped fork clamp of said rotary speed regulating mechanism by a pin or bolt projecting from the sleeve coupler of said U-shaped fork clamp to said worm flute thereof, said stop means fitted on relative sides of said supporting bracket to stop said worm guide spindle from sliding toward either end, said control wheel secured to said worm guide spindle to link with said bi-directional motor which is further linked with an electronically controlled rotary speed control device to accept and perform the commands of Clockwise, Stop and Counterclockwise to move said U-shaped fork clamp and said fluted guide spindle along the ridge of said conical friction wheel.

14. The vertical-axle wind power machine, as recited in claim 10, wherein the friction-rewarding rotary speed multiplying transmission comprises a clutch, which contains a master vertical shaft, a master driving shaft, an upstanding slide lever, a spring means, a horizontal lever, and a linking or pulling wire; said master vertical shaft having a fluted portion attached by said master driving gear at the said flute to provide said master driving gear with a smooth slide way thereon and yet keeping synchronous rotation therewith, said upstanding slide lever having a side fork at the top thereof and secured close to said master driving gear with said side fork lightly clamping the rim thereof, said spring worn over said upstanding slide lever with one end thereof secured to said upstanding slide lever and the other end thereof to a support thereof, and said horizontal lever pivotally mounted to a supporter with one end jointed to the lower end of said upstanding slide lever and the opposite end to said pulling wire.

15. The vertical-axle wind power machine, as recited in claim 1, wherein the oblique blades include a blade element (70a), a slidable counterbalancing rod, a blade axis, a bushed radial sleeve, a stop means, and a stay or an alternative buffer stay; said blade element provided with a tubular longitudinal axis leaving a cut-off portion between at the support point thereof, with a tubular latitudinal axis at the shorter portion thereof, with a joint coupler at the secondary support point at the outer portion of said latitudinal axis, and with heavier frame material along the edge of said narrower wings than used for said wider wings; said slidable counterbalancing rod adjustable and lockable in said tubular longitudinal and latitudinal axes; said bushed radial sleeve having a projecting block close to the outer end thereof said blade axis having a cross sleeve at its extremity to joint to said cut-off portion of said longitudinal axis of said blade element, having a threaded portion at the opposite end thereof and a lug stop and joint at the intermediate portion thereof, and inserted through said bushed radial sleeve and locked therein by a nut or pin at the threaded portion thereof; said bushed radial sleeve further inserted into the tubular extremity of the said radial arm till said projecting block sliding along and resting at the turn end of said L-shaped slot and said lug stop and joint stopped by the extremity of said radial arm at the same time; said stop means having an optional internal L-shaped rib corresponding to said tubular L-shaped slot, having a lip stop extending beyond the extremity of said radial arm and attached at the extremity of said radial arm to define the turn of said blade axis within a range of 180 degrees and the turn of said oblique blade element within the range of its upstanding and overturned positions synchronously; and said stay or buffer stay, with threaded joint coupler at either end to adjust the length thereof and a joint at both end thereof, jointed between said lug stop and joint at said blade axis and said joint coupler at the secondary support point of said blade element to tilt the said blade element to any preferred oblique angle below 45 degrees, said oblique angle adjustable within the range of 45 degrees by adjusting the length of said stay or buffer stay; and said bushed radial sleeve, said hinge cramp stop, the inner portion of said blade axis replaceable with a built-in stop and turn control device.

16. The vertical-axle wind power machine, as recited in claim 15, wherein the buffer stay contains a compression spring and a pair of sleeves, said compression spring having a threaded portion to adjust the length at either end, and a jointing stem at both ends, said sleeves each having a diminished end to hold said jointing stems and having an agreeable opening to wear one to another.

17. The vertical-axle wind power machine, as recited in claim 15, wherein the said stop means comprises an upper tile and a lower tile; said upper and lower tiles having corresponding lugs and notches along the opening, a corresponding curve to cramp said radial arm, and a coaxial hinge engagement; said upper tile having an optional internal L-shaped rib corresponding to said L-shaped slot and having a flanged lip longer than said coupling lower tile, wherein said flanged lip and said counter lug stop and joint at said radial blade axis arranged to cover a total block range of 180 degrees to define the turn of said counter lug stop and stop thereupon within a range of 180 degrees and the turn of said oblique blade within the range of upstanding and overturned positions synchronously.

18. The vertical-axle wind power machine, as recited in claim 1, wherein the oblique blades include a modified blade element, a radial sleeve, a slidable counterbalancing rod, a stay means and a pair of stop means; said blade element (70b) having a window at the support point thereof, said radial sleeve having a lug stop and joint at both ends and either a cross sleeve in side-crossing connection at the intermediate section thereof or a symmetric right side cross sleeve on relative sides at the intermediate section thereof to joint to said cut-off portion of said corresponding longitudinal sleeve and worn over said radial arm close to the extremity and/or at an appropriate intermediate site thereof, said hinge cramp stop secured at both ends of the said radial sleeve with the flanged lip crossing said lug stop and joint at both ends thereof to stop the same from sliding toward either end and to define its turn range within 180 degree and the turn of said blade element between its upstanding and overturned positions synchronously, said slidable counterbalancing rod secured along the shorter portions of said longitudinal and latitudinal axes, and said stay or buffer stay jointed between the joint coupler at said secondary support point of said blade element and the further lug and stop joint at said bushed radial sleeve to tilt said blade element to a preferred oblique angle below 45 degrees and said oblique angle adjustable by adjusting the length of said stay or buffer stay, and said bushed radial sleeve and said hinge cramp stop been replaceable with a built-in stop and turn control device.

19. The vertical-axle wind power machine, as recited in claim 1, wherein the oblique blades include another modified blade element (70c) with an opening along its inner latitudinal axis, a bushed radial sleeve, a hinge cramp stop, a slidable counterbalancing rod, and a stay or a buffer stay; said bushed radial sleeve having a cross sleeve in side-crossing connection at the intermediate section thereof or side cross sleeves in symmetric right side cross connection to relative sides at the intermediate section thereof to joint to the said cut-off portion of said longitudinal axis of said blade element and having a lug stop and joint at both ends, said hinge cramp stop cramped at both ends of said bushed radial sleeve with the flanged lip crossing said lug stop and joint at both ends thereof to stop the same from sliding toward either end and to define its turn range within 180 degree and the turn of said blade element between its upstanding and overturned positions synchronously, said stay or buffer stay jointed between said lug stop and joint at said bushed radial sleeve and said secondary support point of said blade element to tilt said blade element to a preferred oblique angle below 45 degrees, said oblique angle adjustable by adjusting the length of said stay or buffer stay, and said bushed radial sleeve and said hinge cramp stop means replaceable with a built-in stop and turn control device.

20. The vertical-axle wind power machine, as recited in claim 19, wherein the bushed radial sleeve containing a lug stop and joint at both ends and a cross sleeve in side-crossing connection at or right side cross sleeves in symmetric side cross connection on relative sides at the intermediate section thereof to couple with and joint to said cut-off portion of said coupling longitudinal sleeve, and worn over said radial arm close to the extremity and/or at an appropriate intermediate site thereof.

21. The vertical-axle wind power machine, as recited in claim 20, wherein a built-in stop and turn control device comprises a fixed part and a movable part; said fixed part containing a sleeve, a collar baffle and a pair of half-cut collar baffles, and said movable part containing a bushed sleeve and a collar wheeler; said sleeve and bushed sleeve having a corresponding aperture to said radial arm, said sleeve having a cross bore to be worn over and pinned at said radial arm and rigidly connected by said collar baffle at its outer end, said collar baffle having an outward rim with cross bores about and a fan-shaped block inside said rim; said bushed sleeve having a collar wheeler with an inward fan block at an inner end thereof, a lug joint on relative sides close to the inner end thereof, an optional blade axis with a cross sleeve at the outer end thereof, an optional sleeve in side-crossing at the outer end thereof, and an optional pair of symmetric right side cross sleeves on relative sides of the outer end thereof to couple with and joint to said cut-off portion of said longitudinal axis at said support point of the said blade element, said outward and inward fan blocks inside said rim are aligned in a same block section to cover a total block range of 180 degrees to allow and define said collar wheeler to turn within a range of 180 degrees inside said rim, said lug joint positioned on the central line of the turning range of said collar wheeler, said half-cut collar baffles having cross bores corresponding to those in said rim and covered and bolted thereto to prevent said bushed sleeve from detaching or sliding off said fixed part thereof.

22. The vertical-axle wind power machine, as recited in claim 11, wherein the U-shaped fork clamp has a sleeve coupler at one end and two arms each with a fork at the opposite end, said forks arranged to clamp relative sides of said slide friction wheel on one hand and to clamp relative sides of said fluted guide spindle on the other hand.

* * * * *